(12) United States Patent
Luu et al.

(10) Patent No.: US 8,138,965 B1
(45) Date of Patent: Mar. 20, 2012

(54) KINEMATIC ALGORITHM FOR ROCKET MOTOR APPERCEPTION

(75) Inventors: Thu-Van T. Luu, Lumberton, NJ (US); Jeffrey B. Boka, Lumberton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1279 days.

(21) Appl. No.: 11/879,538

(22) Filed: Jul. 18, 2007

(51) Int. Cl.
  *G01S 7/42* (2006.01)
  *G01S 13/00* (2006.01)
(52) U.S. Cl. .............. 342/90; 342/13; 342/62; 342/89; 342/95
(58) Field of Classification Search .......... 342/13, 342/62, 89–97; 244/3.1, 3.11, 3.14, 3.15, 244/3.19
See application file for complete search history.

(56) References Cited

U.S. PATENT DOCUMENTS

| | | | | |
|---|---|---|---|---|
| 3,848,129 A * | 11/1974 | Figler et al. | ............... | 250/339.14 |
| 4,992,797 A * | 2/1991 | Gjessing et al. | ............... | 342/192 |
| 5,012,252 A * | 4/1991 | Faulkner | ............... | 342/192 |
| 5,296,861 A * | 3/1994 | Knight | ............... | 342/357.38 |
| 5,325,098 A * | 6/1994 | Blair et al. | ............... | 342/95 |
| 5,341,142 A * | 8/1994 | Reis et al. | ............... | 342/64 |
| 5,392,050 A * | 2/1995 | Guerci et al. | ............... | 342/90 |
| 5,392,225 A * | 2/1995 | Ward | ............... | 342/189 |
| 5,428,221 A * | 6/1995 | Bushman | ............... | 250/342 |
| 5,430,448 A * | 7/1995 | Bushman | ............... | 342/52 |
| 5,757,310 A * | 5/1998 | Millward | ............... | 342/95 |
| 5,828,334 A * | 10/1998 | Deegan | ............... | 342/90 |
| 5,842,156 A * | 11/1998 | Hong et al. | ............... | 702/179 |
| 6,011,507 A * | 1/2000 | Curran et al. | ............... | 342/70 |
| 6,262,680 B1 * | 7/2001 | Muto | ............... | 342/74 |
| 6,278,401 B1 * | 8/2001 | Wigren | ............... | 342/195 |
| 6,527,222 B1 * | 3/2003 | Redano | ............... | 244/3.14 |
| 6,564,146 B1 * | 5/2003 | Meyer et al. | ............... | 701/213 |
| 6,677,571 B1 * | 1/2004 | Clark et al. | ............... | 250/214.1 |
| 6,739,547 B2 * | 5/2004 | Redano | ............... | 244/3.14 |
| 6,750,806 B2 * | 6/2004 | Fischer | ............... | 342/96 |
| 6,825,792 B1 * | 11/2004 | Letovsky | ............... | 342/14 |
| 7,026,980 B1 * | 4/2006 | Mavroudakis et al. | ......... | 342/90 |
| 7,181,323 B1 * | 2/2007 | Boka et al. | ............... | 701/1 |
| 7,295,149 B1 * | 11/2007 | Wolf | ............... | 342/90 |
| 7,411,543 B1 * | 8/2008 | Boka | ............... | 342/90 |
| 7,511,252 B1 * | 3/2009 | Pedersen et al. | ............... | 244/3.1 |
| 2002/0008657 A1 * | 1/2002 | Poore, Jr. | ............... | 342/96 |
| 2003/0052221 A1 * | 3/2003 | Redano | ............... | 244/3.14 |
| 2004/0021033 A1 * | 2/2004 | Redano | ............... | 244/3.1 |
| 2004/0056792 A1 * | 3/2004 | Miron | ............... | 342/52 |
| 2005/0128138 A1 * | 6/2005 | McCabe et al. | ............... | 342/195 |

* cited by examiner

*Primary Examiner* — Thomas Tarcza
*Assistant Examiner* — Peter Bythrow
(74) *Attorney, Agent, or Firm* — Howard IP Law Group

(57) ABSTRACT

A method, Kinematic Algorithm for Rocket Motor Apperception (KARMA), for processing radar returns for identifying the type of a missile target includes generating tracks representing the missile, and applying the tracks to a set of plural template-based filters, each representing one missile hypothesis, to generate plural sets of missile states, one set for each hypothesis. The missile states are processed to generate kinematic parameter likelihood values (LLHs). The LLH values for each filter hypothesis are normalized and weighted. A weighted maximum likelihood value (WMLH) is calculated for each hypothesis. The correct hypothesis is deemed to be the one having the maximum WMLH, thus identifying the missile type.

23 Claims, 31 Drawing Sheets

| NOMINAL TARGET TEMPLATE | | | | |
|---|---|---|---|---|
| TAL | BOOST ACCELERATION | SPEED | ALTITUDE | ANGLE OF ATTACK |
| $T_1$ | $AB_1$ | $V_1$ | $ALT_1$ | $AOA_1$ |
| $T_2$ | $AB_2$ | $V_2$ | $ALT_2$ | $AOA_2$ |
| $T_3$ | $AB_3$ | $V_3$ | $ALT_3$ | $AOA_3$ |
| $T_4$ | $AB_4$ | $V_4$ | $ALT_4$ | $AOA_4$ |
| $T_5$ | $AB_5$ | $V_5$ | $ALT_5$ | $AOA_5$ |
| $T_6$ | $AB_6$ | $V_6$ | $ALT_6$ | $AOA_6$ |
| $T_7$ | $AB_7$ | $V_7$ | $ALT_7$ | $AOA_7$ |
| $T_8$ | $AB_8$ | $V_8$ | $ALT_8$ | $AOA_8$ |
| $T_9$ | $AB_9$ | $V_9$ | $ALT_9$ | $AOA_9$ |
| $T_{10}$ | $AB_{10}$ | $V_{10}$ | $ALT_{10}$ | $AOA_{10}$ |
| $T_{11}$ | $AB_{11}$ | $V_{11}$ | $ALT_{11}$ | $AOA_{11}$ |

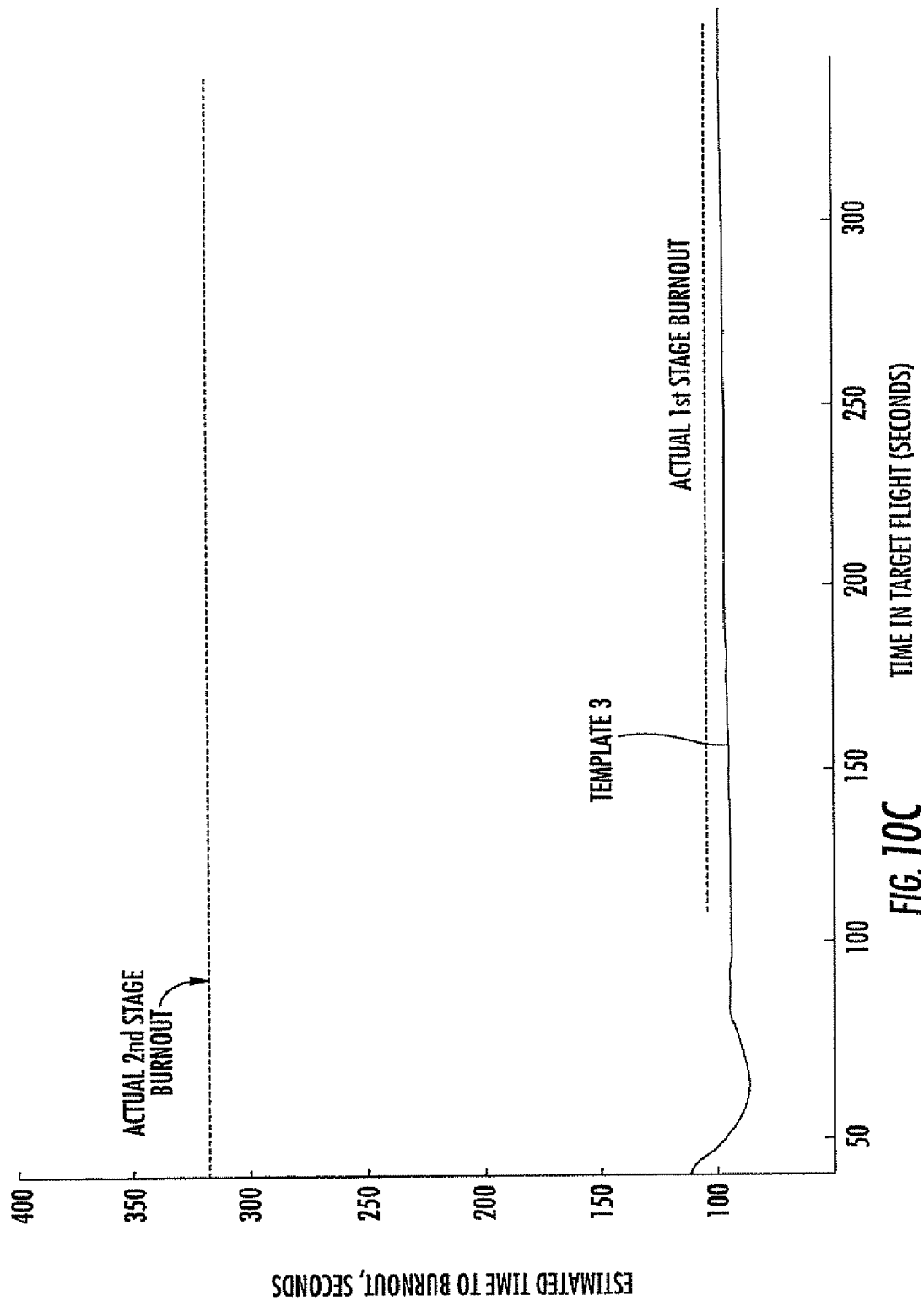

| NOMINAL TARGET TEMPLATE | | | | |
|---|---|---|---|---|
| TAL | BOOST ACCELERATION | SPEED | ALTITUDE | FLIGHT PATH ANGLE |
| $T_1$ | $AB_1$ | $V_1$ | $ALT_1$ | $FPA_1$ |
| $T_2$ | $AB_2$ | $V_2$ | $ALT_2$ | $FPA_2$ |
| $T_3$ | $AB_3$ | $V_3$ | $ALT_3$ | $FPA_3$ |
| $T_4$ | $AB_4$ | $V_4$ | $ALT_4$ | $FPA_4$ |
| $T_5$ | $AB_5$ | $V_5$ | $ALT_5$ | $FPA_5$ |
| $T_6$ | $AB_6$ | $V_6$ | $ALT_6$ | $FPA_6$ |
| $T_7$ | $AB_7$ | $V_7$ | $ALT_7$ | $FPA_7$ |
| $T_8$ | $AB_8$ | $V_8$ | $ALT_8$ | $FPA_8$ |
| $T_9$ | $AB_9$ | $V_9$ | $ALT_9$ | $FPA_9$ |
| $T_{10}$ | $AB_{10}$ | $V_{10}$ | $ALT_{10}$ | $FPA_{10}$ |
| $T_{11}$ | $AB_{11}$ | $V_{11}$ | $ALT_{11}$ | $FPA_{11}$ |

FIG. 12

KINEMATIC ALGORITHM FOR ROCKET MOTOR APPERCEPTION

FIELD OF THE INVENTION

This invention relates to methods for identifying the type of missile or target to aid in determining its parameters to further the estimate of the position and/or velocity.

BACKGROUND OF THE INVENTION

Ballistic missile defense has become a significant priority as national intelligence indicates a growing missile threat from rogue nations that might obtain weapons of mass destruction and use ballistic missiles to fire them at U.S. forces abroad, U.S. allies or the continental United States. A desirable engagement strategy against ballistic missiles is to intercept the target as early as possible during the boost phase or early ascent phase when the target is a large object and has not dispersed countermeasures or multiple warheads. Such a strategy minimizes the requirements for warhead and decoy discrimination, and allows for multi-layered defense opportunities. A missile defense system supporting this strategy must include an accurate boost phase target state estimator. Without accurate target state estimates, a fire control system cannot obtain valid intercept solutions for launching the interceptor during boost, and intercepting during the early ascent phase.

Challenges in developing a boost phase tracking algorithm include unpredictable target accelerations while the target is in powered flight, and uncertainty of its burn time. Targets powered by solid rocket motor targets present the additional challenge of irregular thrust acceleration profiles. Due to the significant changes in acceleration during the target's boost phase, filters that assume constant acceleration cannot meet the stringent accuracies required of most fire control systems. Current state-of-the-art template-based filters use position and velocity templates assuming constant accelerations or rocket equation acceleration modeling. Such templates are subject to error attributable to motor burn variations, energy management (lofted/depressed trajectories), ISP variations, and early thrust terminations. FIG. 1 is a plot of target thrust versus time for "hot," nominal and "cold" rocket motors or engines. The nominal thrust profile as a function of time after launch (TAL) is shown by plot 12. The actual motor may be a variation about this nominal profile. For a hot motor, the motor gain is greater than 1, K>1, with the thrust profile shown by plot 14. For a cold motor, the motor gain K is less than 1, K<1, with the thrust profile shown by plot 16. It will be clear that the accelerations represented by the thrust profiles of FIG. 1 are significantly different.

In addition, uncertain knowledge of the time of launch of the target results in error in estimating the time after launch. The uncertainty in knowledge of the time after launch leads to error in indexing into the template, which in turn tends to introduce more error in the acceleration estimate. For example, if the estimate of time after launch in FIG. 1 is indicated by $t_{estimate}$ and the actual time is indicated by $t_{actual}$, there will be a substantial error in estimating the acceleration even if the proper plot were known. The indexing error and acceleration variations from the nominal template all contribute to erroneous acceleration estimates and ultimately poor estimates of the target velocity and position. The indexing error, delT, is the uncertainty in the target's time after launch (TAL), i.e., the time difference between the initial index into the nominal template and the target's true TAL.

U.S. patent application Ser. No. 11/189,234 filed Jul. 26, 2005 in the name of Luu et al. and entitled Template Updated Boost Algorithm (TUBA) describes a method for estimating the states of a boosting target using nominal templates. The templates include profiles of the target (a) thrust acceleration, (b) altitude, (c) speed, and (d) angle-of-attack as a function of time after launch, all updated using the states of a filter to correct for template indexing error, template boost acceleration variations, and template angle-of-attack variations, thereby producing estimated target states unencumbered by motor burn boost variations and providing for accurate determination of end-of-boost.

According to another aspect of the method for estimating at least the position and velocity state of a boost vehicle target according to the Luu et al. application, the state estimates include the position and velocity, and at least one of (a) variation in engine burn rate, (b) error in time after launch and (c) error in angle of attack. The method includes the step of sensing at least the position of the target to thereby generate target-position information. The method also includes the step of providing a template characterizing nominal values of acceleration of the boost vehicle target due to engine thrust, speed, altitude, and angle-of-attack, all as a function of time after target launch. The target altitude is calculated or determined, possibly from the target-position information, to generate calculated target altitude. A time index is established by entering the template at the calculated target altitude. At least that (or those) nominal values of time after launch, acceleration, speed, and angle of attack corresponding to the calculated target altitude are read from the template. Both the state estimate and the associated covariances of an extended Kalman filter are initialized with the nominal value of time after launch, acceleration, speed, and angle of attack corresponding to the calculated target altitude. The state estimates and covariances of the Kalman filter are propagated in time to generate a time-updated vector of state estimates representing the predicted state of the target, using the template profile information updated by at least one of (a) variation in engine burn rate, (b) error in time after launch and (c) error in angle of attack. The states are updated using the measurements, to thereby produce a vector of measurement updated state estimates and covariances of the boost vehicle target, including position and velocity, and at least one of (a) variation in engine burn rate, (b) error in time after launch and (c) error in angle of attack.

The Template Updated Boost Algorithm (TUBA) is a boost phase filter or processing that estimates variations with respect to nominal templates representing the target's kinematic motion. FIG. 2 is an example of a typical nominal template file of thrust acceleration versus time in seconds (s). In FIG. 2, the thrust acceleration profile of a solid-fuel motor is illustrated by a solid line designated 210, and the profile for a liquid-fuel motor is illustrated by a dash line designated 212. TUBA is capable of estimating rocket motor burn variations, template indexing error (the time difference between the actual and the estimated Time After Launch), and the target's angle of attack. Using nominal templates corrected by these unique filter states, TUBA predicts future thrust acceleration, position, and velocity vectors with improved reliability. This can be crucial for fire control systems, where knowing the target's future position and velocity is needed to accurately predict an intercept point.

Another boost phase filter is described in U.S. Pat. No. 7,181,323, issued Feb. 20, 2007 in the name of Boka et al. and entitled Computerized Method for Generating Low-Bias Estimates of Position of a Vehicle From Sensor Data. This boost filter is the Unified Unbiased Rocket Equation Extended Kalman Algorithm (UUREEKA). It differs from the current TUBA in that UUREEKA models target dynamics using the fundamental rocket equation and is ideal for tracking liquid-fueled targets whose acceleration profiles can be modeled using the rocket equation. UUREEKA is less advantageous for solid fuel rocket motor that exhibit irregular thrust profiles. TUBA is well adapted for tracking solid-fuel targets that have irregular thrust acceleration profiles, which cannot be modeled by the rocket equation. As mentioned, FIG. 2 shows a representative thrust acceleration profile 210 for a solid rocket motor, and a liquid rocket motor profile 212. Since TUBA is template based, it can also be used to track liquid-fuel targets governed by the rocket equation. TUBA complements UUREEKA by providing capability against solid rocket fuel based target threats. Thus, the combination of UUREEKA and TUBA filtering may provide more complete capability against all ballistic missile threats.

TUBA is a template filter which utilizes a table of nominal target data relating target time after launch (TAL) to boost acceleration, speed, altitude, and angle of attack. An example of a nominal target template data table 300 appears as FIG. 3. In FIG. 3, various Time After Launch (TAL) values designated $T_1$, $T_2$, $T_3$, $T_4$, $T_5$, $T_6$, $T_7$, $T_8$, $T_9$, $T_{10}$, and $T_{11}$ correlate to Boost Acceleration values $AB_1$, $AB_2$, $AB_3$, $AB_4$, $AB_5$, $AB_6$, $AB_7$, $AB_8$, $AB_9$, $AB_{10}$, and $AB_{11}$, respectively, to Speed values $V_1$, $V_2$, $V_3$, $V_4$, $V_5$, $V_6$, $V_7$, $V_8$, $V_9$, $V_{10}$, and $V_{11}$, respectively, to Altitude values $Alt_1$, $Alt_2$, $Alt_3$, $Alt_4$, $Alt_5$, $Alt_6$, $Alt_7$, $Alt_8$, $Alt_9$, $Alt_{10}$, and $Alt_{11}$, respectively, and to Angle of Attack values $AOA_1$, $AOA_2$, $AOA_3$, $AOA_4$, $AOA_5$, $AOA_6$, $AOA_7$, $AOA_8$, $AOA_9$, $AOA_{10}$, and $AOA_{11}$, respectively. Of course, a template may include many more values than the illustrated 11 values, or possibly fewer.

FIG. 4 shows how the nominal target template is used in the TUBA process. In FIG. 4, the current radar target measurement is applied by way of a path 410. Ordinarily, the template initialization is performed using the altitude template. Systems such as Spaced Based Infrared Sensor (SBIRS) also provide velocity information which could be used for template initialization using the speed template.

The entry point into the target template 300 of FIG. 4 is found using the current measurement altitude, $Alt_o$, calculated from current target measurement data. A lookup algorithm is used to select the time index, $I_o$, in the table corresponding to $Alt_o$. $I_o$ refers to the template time index $T_I$ indicated by a subscript in the TAL column of FIG. 3. Thus, if the calculated (or otherwise determined) altitude is, say, one thousand feet, the corresponding altitude in the table might be $T_4$, and the corresponding index is $I_4$. $I_o$ is then used as the initial time entry into the acceleration and angle of attack templates to obtain the target's nominal boost acceleration, and angle of attack. In the example, the index $I_4$ would point to acceleration $AB_4$ and angle of attack $AOA_4$. TUBA processing as represented by block 412 in FIG. 4 uses the Boost acceleration $AB(K, I_m)$ and Angle of Attack $AOA(I_m)$ from the template 300 to produce accurate estimates of the target's position $P(t_m)$ and velocity states $V(t_m)$. In addition, block 412 estimates the error $de/A(t_m)$ in angle of attack, error delT in the time index into the template, and a scalar (hot/cold) motor variation factor, K. In conjunction with the typical position and velocity states, additional states delT and K, are used to adjust the initial time index $I_o$ to account for initial time index error (possibly attributable to incorrect initial estimate of altitude) and template difference due to motor variations. The TUBA processing produces estimates which are coupled for use by way of paths designated together as 414.

The TUBA algorithm associated with block 412 of FIG. 4 is represented by a logic flow chart or diagram 500 of FIG. 5. In the logic flow of FIG. 5, a measurement is received at time $t_m$ as suggested by logic path 510. The algorithm begins with initialization of filter and timing parameters in blocks 512 and 514. Initial estimates of the filter states and state covariances are then propagated forward in time corresponding to the Kalman "time update" step 516. Staging timing parameters are updated in block 524, after the state propagation, and staging events and early thrust termination are determined in block 542. Finally, the Kalman Gains are computed, and the measurement updated state covariances are updated corresponding to the Kalman filter "measurement update" step 526. The process repeats with the measurement updated state estimates and error covariance feeding back to the time update equations.

More specifically, the TUBA process of FIG. 5 begins with arrival over a path 510 of an initial position measurement from a sensor tracking a boosting target. Decision block 512 initially routes the measurement to the TUBA Initialization function or block 514. The TUBA Initialization function 514 initializes the filter and template parameters. FIG. 6 represents the logic 600 of the TUBA Initialization step 514 of FIG. 5. In FIG. 6, the first step in initialization of the filter and template parameters is to calculate target altitude $Alt_o$ from the current measured position input, as suggested by block 610 of FIG. 6. From block 610, the logic of the initialization 600 flows to a block 612, which represents use of the table lookup to determine target Time After Launch (TAL) template_index, for the given $Alt_o$. Block 614 represents use of the template_index produced by block 612 together with nominal staging times. Nominal staging times are not derived from part of the templates which are a function of time; rather they are a few data points corresponding to nominal times when the target begins the next stage. For example, if the target has three stages, there will be three corresponding nominal staging times. Nominal staging times are used to determine the target's current stage number thisStage. The amount of elapsed time in the current stage tInstage is determined in a block 616 by $$tInstage = template\_index - stageTimePast \quad (1)$$

where stageTimePast is the nominal stage time of the previous stage, as illustrated in FIG. 7. In FIG. 7, the current time into the template is template_index. Block 618 of FIG. 6 represents the initialization of Kalman filter states and error covariances to produce the following equations (2), (3), (4), (5), and (6)

$$\underline{X} = \underline{X}_M \quad (2)$$

is the initial position vector (set to measured value);

$$\underline{\dot{X}} = \underline{\dot{X}}_M \quad (3)$$

is the initial velocity vector (set to an initial estimate);

$$K = 1 \quad (4)$$

is the motor parameter (set to nominal value);

$$delT = 0 \quad (5)$$

is the initial estimate of error in template_index; and $$delA = 0 \quad (6)$$

is the initial estimate of error in angle of attack.

The TUBA Initialization function 514, represented as 600 of FIG. 6, includes a block 620 which represents the definition of the timing parameter template_index used to look up values from the nominal template $$Template\_index = (tInstage - delT) * K + stageTimePast \quad (7)$$

From block 620, the logic of FIG. 6 flows to a block 622, which represents the definition of the time offset between the system time and template_index $$\text{offsetError} = \text{template\_index} - tgt\text{MeasTime} \quad (8)$$

where variable "tgtMeasTime" is the current system time, variously designated t or tm in FIG. 5.

TUBA uses a nine-state Extended Kalman filter which estimates the position and velocity vectors and three additional states. The three additional states are used to resolve the deficiencies associated with the use of a nominal acceleration profile. The TUBA filter equations are developed under the assumption that the target is either ballistic (falling under the force of gravity) or the specific force (such as thrust acceleration) is exactly known and can therefore be compensated for. It is also assumed that the target is not subject to significant atmospheric drag, which is reasonable in view of the high altitudes at which target tracking occurs. Alternatively, it is assumed that atmospheric drag can be properly compensated for. Equations (9), (10), and (11) model the target kinematics under these assumptions $$\underline{\ddot{X}} = \text{Acc Gravity} + \text{Acc Centripetal} + \text{Acc Thrust} + \text{Acc Coriolis} \quad (9)$$

$$\underline{\ddot{X}} = \frac{-\mu \underline{Z}}{|\underline{Z}|^3} - \underline{\omega} \times (\underline{\omega} \times \underline{Z}) + |Tacc| * \hat{\underline{T}} - 2\underline{\omega} \times \underline{\dot{X}} \quad (10)$$

$$\underline{Z} = \underline{X} + \underline{Re} \quad (11)$$

where:
μ is the Earth gravitational constant, $3.986005 * 10^{14}$ m$^3$/s$^2$;
w is the magnitude of Earth's angular velocity, $7.29211574 * 10^{-5}$ rad/s;
|Tacc| is the boost acceleration magnitude; and
$\hat{T}$ is the unit thrust vector.
The TUBA state vector is $$s = \begin{Bmatrix} X \\ \dot{X} \\ K \\ delT \\ delA \end{Bmatrix} \quad (12)$$

where:
X and $\dot{X}$ are three-dimensional position and velocity vectors, respectively;
K is a scalar factor reflecting the target rocket motor, hot (K>1.0), cold (K<1.0), or nominal (K=1.0);
delT is the error in the initial time used to look up target parameters from the nominal templates; and
delA is the error in the estimate of the target's angle of attack.

The TUBA dynamics equations (i.e. the nonlinear TUBA state derivative equations) are $$\dot{s} = \frac{d}{dt}s = \begin{Bmatrix} \underline{\dot{X}} \\ \frac{-\mu \underline{Z}}{|\underline{Z}|^3} - \underline{\omega} \times (\underline{\omega} \times \underline{Z}) + |Tacc| * \hat{\underline{T}} - 2\underline{\omega} \times \underline{\dot{X}} \\ 0 \\ 0 \\ 0 \end{Bmatrix} \quad (13)$$

and are based on the assumed target kinematics set forth above. Additionally, it is assumed that K, delT, and delA are constants.

The thrust acceleration |Tacc|, is obtained from the nominal acceleration template using template_index and K estimate as $$|Tacc| = K * \text{BoostAccLookup}(\text{template\_index}) \quad (14)$$

The unit thrust vector $\hat{T}$ is calculated using the nominal angle of attack lookup, estimated position, velocity, and delA as $$AoaEst = AOALookup(\text{template\_index}) + delA \quad (15)$$

$$\underline{yL2} = \hat{\underline{\dot{X}}} \quad (16)$$

$$\underline{zL2} = \left(\hat{\underline{X}} \times \hat{\underline{\dot{X}}}\right) \times \underline{yL2} \quad (17)$$

$$\hat{\underline{T}} = \underline{yL2} * \cos(AoaEst) - \underline{zL2} * \sin(AoaEst) \quad (18)$$

where the template_index is defined by equation (7).

Referring once more to FIG. 5, the logic flows from initialization block 514 to a state propagation step 518, which is part of time update block 516. In the following description, a ^ notation is used to denote filter estimates of the respective variables, and a superscript (*)$^-$ represents a time update. Time propagation of the TUBA state vector in block 518 of FIG. 5 is performed by numerically integrating the state derivative vector from the previous time $t_{i-1}$ to the current time $t_i$ where the subscript i refers to the filter cycle iteration $$\hat{s}(t_i)^- = \hat{s}(t_{i-1}) + \int_{t_{i-1}}^{t_{i-1}+\Delta t} \hat{\dot{s}}(\tau) d\tau \quad (19)$$

A high order numerical integration algorithm such as the $2^{nd}$ order Runge Kutta algorithm might be used for the integration process. The incremental time step, Δt, refers to either the nominal update cycle time or the incremental time step from the last cycle time to the current measurement time $t_M$ (i.e. $\Delta t = t_m - t_{i-1}$).

From state time propagation block 518, the logic of FIG. 5 flows to a block 520. Block 520 represents calculation of the state transition matrix for the extended TUBA Kalman filter algorithm. The Jacobian matrix corresponding to the state vector and dynamics described in equations (12) and (13) is $$J = \left[\frac{\partial \dot{s}}{\partial s}\right] = \begin{bmatrix} \frac{\partial \dot{x}}{\partial s} \\ \frac{\partial \ddot{x}}{\partial s} \\ \frac{\partial \dot{K}}{\partial s} \\ \frac{\partial del\dot{T}}{\partial s} \\ \frac{\partial del\dot{A}}{\partial s} \end{bmatrix} = \begin{bmatrix} 0_{3\times3} & I_{3\times3} & 0 & 0 & 0 \\ \frac{\partial \ddot{X}}{\partial X} & \frac{\partial \ddot{X}}{\partial \dot{X}} & \frac{\partial \ddot{X}}{\partial K} & \frac{\partial \ddot{X}}{\partial delT} & \frac{\partial \ddot{X}}{\partial delA} \\ & & 0_{1\times9} & & \\ & & 0_{1\times9} & & \\ & & 0_{1\times9} & & \end{bmatrix} \quad (20)$$

where components of the Jacobian corresponding to $\partial \underline{\ddot{x}}/\partial \underline{s}$ are defined below in equations 21 to 26

$$\frac{\partial \ddot{X}}{\partial X} = \frac{-\mu \hat{Z}}{|\hat{Z}|^3}[I_{3\times3}] - \frac{3}{|\hat{Z}|^2}\hat{Z} \cdot \hat{Z}' - [[\hat{\omega}]] \cdot [[\hat{\omega}]] \quad (21)$$

$$\frac{\partial \ddot{X}}{\partial \dot{X}} = -2 \cdot [[\hat{\omega}]] \quad (22)$$

Note that the [[•]] notation denotes a skew symmetric matrix of the vector argument.

$$\frac{\partial \ddot{X}}{\partial K} \text{ and } \frac{\partial \ddot{X}}{\partial delT}$$

are performed numerically by choosing some small value for ∂K and ∂delT. The resulting equations are $$\frac{\partial \ddot{X}}{\partial K} = a1 + \hat{K} * \frac{a2 - a1}{dk} \quad (23)$$

$$\frac{\partial \ddot{X}}{\partial delT} = -\hat{K} * \frac{(a3 - a1)}{dt} \quad (24)$$

where:

$dk=0.001$ $dt=0.01$ $a1$=BoostAccLookup(template_index)

$a2$=BoostAccLookup(template_index+(tInstage+$dt$) *$dk$)

$a3$=BoostAccLookup(template_index+$dt$)

The partial derivative of acceleration with respect to the error in angle of attack, $$\frac{\partial \ddot{X}}{\partial delA},$$

is given by $$\frac{\partial \ddot{X}}{\partial delA} = \hat{K} * BoostAccLookup(\text{template\_index}) * \partial \hat{T} \quad (25)$$

where:

$\partial \underline{\hat{T}} = -\underline{yL2}*\sin(\text{AoaEst}) - \underline{zL2}*\cos(\text{AoaEst})$ (26)

The partial derivative of $\hat{T}$ is taken with respect to angle of attack only, since variations of the thrust vector with respect to position and velocity are minimal. $\hat{T}$, AoaEst, yL2, and zL2 are defined in equations (18), (15), (16), and (17), respectively.

From Jacobian computation block 520 of FIG. 5 the logic flows to a block 522, representing the covariance propagation portion of the time update 516. The state transition matrix used for the time propagation of the TUBA error covariance can be approximated as $$\Phi \approx I + J\Delta t + \frac{J^2 \Delta t^2}{2} \quad (27)$$

Time propagation of the TUBA error covariance matrix P is performed with the equation $$P(t_i)^- = \Phi P(t_{i-1}) \Phi^T + Q_i \quad (28)$$

where:

Q is the 9×9 TUBA state noise matrix whose diagonal elements are chosen based on tuning considerations.

From covariance propagation portion or block 522 of time update 516 of FIG. 5, the logic flows to a Template Parameter Update block 524 and then to a Staging Logic Early Thrust Termination Block 542, both described in more detail below.

The logic of FIG. 5 arrives at a Gain Computation portion 528 of a Measurement Update block 526. The Kalman gain matrix is calculated in block 528 using the measurement matrix and the TUBA error covariance matrix $$K = P(t_i)^- \cdot H^T \cdot (H \cdot P(t_i)^- \cdot H^T + R)^{-1} \quad (29)$$

where:

$H = [I_{3 \times 3} \; 0_{3 \times 3} \; 0_{3 \times 3}]$

H is the measurement matrix, and R is the measurement noise covariance matrix associated with the currently reporting sensor.

The logic flows from block 528 of FIG. 5 to a State Measurement Update block 530. State Measurement Update block 530 computes the measurement residuals and updates the TUBA state vector $$\underline{\hat{s}}_i = \underline{\hat{s}}_i^- + K \cdot (\underline{X}_m - H \cdot \underline{\hat{X}}^-) \quad (30)$$

Finally, the logic of FIG. 5 reaches the Covariance Measurement Update function 532, which performs the measurement update of the state covariance matrix $$P(t_i) = (I - K \cdot H) \cdot P(t_i)^- \quad (31)$$

and the logic returns to time update block 516, with updated time $T = T_m + \Delta t$ for the next calculation cycle, by way of a logic path 540.

Template Parameter Update block 524 of FIG. 5 updates the time index, template_index, used in the next filter update pass to look up the thrust acceleration and angle of attack. Template parameters tInstage and template_index are defined in equations (1) and (2), respectively, and were also described in conjunction with block 514 of FIG. 5. At each update after initialization, tInstage and template_index are updated $$t\text{Instage} = t\text{Instage} + \Delta t \quad (32)$$

where Δt is the measurement update interval $$\text{template\_index} = (t\text{Instage} - del\hat{T}) * \hat{K} + stageTimePast \quad (33)$$

where stagetimepast is the nominal past stage.

Note that the initial error in tInstage due to the initial guess at the value of target time after launch is removed in the calculation of template_index via the filter state delT̂, and the acceleration profile variation due to motor differences is corrected by the filter state K̂.

The TUBA target staging and early thrust termination logic block 542 of FIG. 5 provides timely estimates of the target's burn times and detects when early thrust termination has occurred. Block 542 is not mandatory for estimating the states of a boosting target using nominal template profiles of target (a) thrust acceleration, (b) altitude, (c) speed, and (d) angle-of-attack as a function of time after launch, updated using the states of a filter to correct for template indexing error, template boost acceleration variations, and template angle-of-attack variations. However, the Staging Logic Early Thrust Termination block 542 can improve the accuracy of the target state estimation by providing timely transition to the ballistic phase.

If the target is still thrusting, the estimated burn time for the current stage is calculated in block 542 of FIG. 5 according to equation (34)

$$tBOEst = \frac{(stageTimeCurrent - stageTimePast)}{\hat{K}} + stageTimePastEst - offsetError + \frac{de\hat{l}T}{\hat{K}}$$

where:
stageTimeCurrent=nominal current stage burn out time
stageTimePast=nominal past stage burn out time
stageTimePastEst=estimated value of the previous stage burn out time
$\hat{K}$ and $de\hat{l}t$=state estimates from the filter
offsetError=initial difference between template_index and measured time.

Staging times for subsequent stages are updated relative to the current stage time estimate.

To account for the uncertainties in the estimated burn out time, a staging window (e.g. 3 to 4 seconds) is set on either side of the estimated current stage burn out time in block 542 of FIG. 5. If the target is within the staging window, the estimated burn out time is used to determine if the target has entered the next stage or has entered the ballistic phase. When a staging event has occurred, filter estimates for $\hat{K}$ and $de\hat{l}\hat{T}$ are reset to their initial values. The target stage number is incremented, and template timing parameters are reinitialized as

| | | (35) |
|---|---|---|
| $\hat{K} =$ | 1 | |
| $de\hat{l}T =$ | 0 | |
| thisStage = | thisStage + 1 | |
| offsetError = | stageTimeEstPast − tgtMeasTime | |
| tInstage = | tgtMeasTime − stageTimeEstPast | |
| template_time = | (tInstage − $de\hat{l}\hat{T}$) * $\hat{K}$ + stageTimePast | | where:
tgtMeasTime is current system time.

When the target has exited a staging window, the filter error covariance for K and delA are reset to their initial default values by the Staging Logic portion of block 542 of FIG. 5. When the target is ballistic, the error covariance for K, delT, and delA are all reinitialized to some small value, (e.g. 0.00000001).

Liquid-propellant rocket engines control the thrust by varying the amount of propellant that enters the combustion chamber. By stopping the flow of propellants into the combustion chamber, these targets can effectively terminate their thrust prior to the nominal end of boost time. Solid-propellant rockets are not as easy to control as liquid rockets. Once started, the propellants burn until they are gone. However, some solid-fuel engines have hatches on their sides that can be cut loose by remote control to release the chamber pressure and terminate thrust. Early thrust termination poses a particularly difficult problem for tracking since it is an unknown change in acceleration applied at an unknown time. If the filter continues to assume nominal boost acceleration when in actuality the rocket has early thrust terminated, potentially huge errors would result in the estimated states which might well render invalid any fire control solution. The early thrust termination logic portion of block 542 of FIG. 5 attempts to overcome this difficulty. More particularly, at 20 seconds (or at some other selected time) prior to the estimated final burn out time, TUBA increases the K covariance values and observes for changes in K estimates. At this point, the K factor has settled to the correct value reflecting the state of the rocket motor. Therefore, a sudden and consistent change in K can only be caused by a substantial change in the target's acceleration. Such a sudden, consistent change in K indicates that the target has early thrust terminated, and gives an indication of the time of thrust termination which can be used in the overall state estimates.

Thus, a method according to the Luu et al. patent application is for estimating the states of a boosting target using nominal templates (300). The templates (300) comprise nominal profiles of the target (a) thrust acceleration, (b) altitude, (c) speed, and (d) angle-of-attack as a function of time after launch, all updated using the states of a filter to correct for template indexing error, template boost acceleration variations, and template angle-of-attack variations, thereby producing estimated target states unencumbered by motor burn boost variations and providing for accurate determination of end-of-boost.

According to another aspect of the method of the Luu et al. patent application, for estimating at least the position and velocity state of a boost vehicle target, the state estimates include the position and velocity, and at least one of (a) variation in engine burn rate, (b) error in time after launch and (c) error in angle of attack. The method comprises the step of sensing at least the position of the target to thereby generate target-position information. The method also comprises the step of providing a template (300) characterizing nominal values of acceleration of the boost vehicle target due to engine thrust, speed, altitude, and angle-of-attack, all as a function of time after target launch. The target altitude is calculated or determined, possibly from the target-position information, to generate calculated target altitude. A time index ($I_o$) is established by entering the template (300) at the calculated target altitude ($Alt_o$). At least that (or those) nominal values of time after launch (TAL), acceleration ($AB_x$), speed ($V_x$), and angle of attack ($AOA_x$) corresponding to the calculated target altitude are read from the template, where the subscript x represents any value. Both the state estimate and the associated covariances of an extended Kalman filter are initialized with the nominal value of time after launch, acceleration, speed, and angle of attack corresponding to the calculated target altitude. The state estimates and covariances of the Kalman filter are propagated in time (516) to generate a time-updated vector of state estimates representing the predicted state of the target, using the template profile information (524) updated by at least one of (a) variation in engine burn rate, (b) error in time after launch and (c) error in angle of attack. The states are updated (526) using the measurements, to thereby produce a vector of measurement updated state estimates and covariances of the boost vehicle target, including position and velocity, and at least one of (a) variation in engine burn rate, (b) error in time after launch and (c) error in angle of attack.

The TUBA method for determining the state of a target relies, at least in part, on identification of the target, which is to say identification of the type of missile (and therefore the parameters of the missile). This reliance also applies to other template-based missile tracking methods. The identification of the target relies, at least in part, on the matching of the sensed parameters to the nominal templates after the filters have settled. However, the sensed parameters of a given missile may deviate from the nominal, and possibly overlap with the nominal values of other missile types. Thus, it is conceivable that the wrong nominal filter will be selected as the best representation of the target and its parameters. This, in turn, can be expected to result in less-than-optimal predictions being used in an antimissile fire-control system. Improved or alternative methods for identification of the missile type are desired to aid in establishing its parameters for tracking.

SUMMARY OF THE INVENTION

A method according to an aspect of the invention is for identifying a missile, which may be in a boosting phase. The method comprises the steps of receiving radar returns from a missile to thereby generate a plurality of position measurements constituting a target missile track. A plurality of nominal missile parameters, which may be rocket parameters (such as speed, altitude, and flight path angle), are provided for each missile type which is of interest (for each hypothesis). Each of the nominal missile rocket parameters for each missile type which is of interest are applied to a separate boost phase filter of a set of plural boost phase filters. The track is applied to each filter of the set of plural filters, which may be boost phase filters, to thereby generate a plurality of state estimates, one from each filter of the set. The output of each of the filters is processed with the nominal missile rocket parameters applied to the filter, to generate a maximum likelihood value for each filter parameter (such as speed, altitude, flight path angle, and acceleration) and filter output. That missile represented by the filter exhibiting the maximum likelihood is selected as the correct missile type. In one mode of the method, the step of providing a plurality of nominal missile parameters for each missile type which is of interest comprises the step of providing at least nominal missile speed, altitude, and flight path angle. When the filters are boost phase filters, the parameters may include acceleration.

In another mode of the method, the step of processing the output of each of the boost phase filters with the nominal missile rocket parameters applied to the boost phase filter comprises the steps of:

calculating the speed likelihood LLH for each filter hypothesis j by $$MLHSpeed(j) = \frac{1}{\sqrt{2\pi(P_{Speed} + P_{STemplate})}} e^{\left(\frac{-\frac{1}{2}delSpeed^2}{(P_{Speed}+P_{STemplate})}\right)} \quad (38)$$

where:

$$P_{Speed} = \frac{\dot{Z}' P_{\dot{z}\dot{z}} \dot{Z}}{\dot{Z}'\dot{Z}}$$

is the covariance of the magnitude of $\underline{\dot{Z}}$;

$$P_{STemplate} = \left(\frac{STemplate(TALest - dt) - STemplate(TALest)}{dt}\right)^2 P_{TALest}$$

is the covariance of the speed from the nominal template lookup;

delSpeed=Speed(j)−STemplate(TALest) is the speed difference between the filter value and the template value; and dt=0.1 is a small time increment. In another mode of the method, the step of processing the output of each of the boost phase filters with the nominal missile rocket parameters applied to the boost phase filter comprises the steps of:

calculating the altitude likelihood parameter MLHAlt for each filter hypothesis j by $$MLHAlt(j) = \frac{1}{\sqrt{2\pi(P_{Alt} + P_{AltTemplate})}} e^{\left(\frac{-\frac{1}{2}delAlt^2}{(P_{Alt}+P_{AltTemplate})}\right)} \quad (39)$$

where:

$$P_{Alt} = \frac{Z' P_{zz} Z}{Z'Z}$$

is the covariance of the target altitude;

$$P_{AltTemplate} = \left(\frac{AltTemplate(TALest - dt) - AltTemplate(TALest)}{dt}\right)^2 P_{TALest}$$

the covariance of the speed from the nominal template lookup;

$$P_{AltTemplate} = \left(\frac{AltTemplate(TALest - dt) - AltTemplate(TALest)}{dt}\right)^2 P_{TALest}$$

is the covariance of the speed from the nominal template lookup; and dt=0.1 is some small time increment.

In yet another mode of the method according to an aspect of the invention the step of processing the output of each of the boost phase filters with the nominal missile rocket parameters applied to the boost phase filter comprises the steps of:

calculating the flight path angle likelihood MLHFpa for each filter hypothesis j by $$MLHFpa(j) = \frac{1}{\sqrt{2\pi(P_{Fpa} + P_{FpaTemplate})}} e^{\left(\frac{-\frac{1}{2}delFpa^2}{(P_{Fpa}+P_{FpaTemplate})}\right)} \quad (40)$$

where:
is the covariance of the magnitude of the flight path angle calculated using $$P_{Fpa} = TT^*(T'_p P_{ZZ} T_p + T_v' P_{\dot{Z}\dot{Z}} T_v + T'_p P_{Z\dot{Z}} T_v + T_v' P_{\dot{Z}Z} T_p) \quad (41)$$

where:

$$TT = \frac{1}{(1-\cos^2\theta) * |Z| * |\dot{Z}|};$$

$$\cos\theta = \frac{Z'\dot{Z}}{|Z||\dot{Z}|}$$

$$T_P = \frac{(Z \cdot \dot{Z})Z}{Z \cdot Z} - \dot{Z}; \text{ and}$$

$$T_V = \frac{(Z \cdot \dot{Z})\dot{Z}}{\dot{Z} \cdot \dot{Z}} - Z$$

-continued $$P_{FpaTemplate} = \left(\frac{FpaTemplate(TALest - dt) - FpaTemplate(TALest)}{dt}\right)^2 P_{TALest}$$

is the covariance of the nominal flight path angle template lookup;

delFpa=Fpa(j)−FpaTemplate(TALest) is the flight path angle difference between the filter value and the template value; and dt=0.1 is some small time increment.

In another mode of this aspect of the method of the invention, the step of selecting as the correct missile type that missile represented by the filter exhibiting the maximum likelihood comprises the steps of:

normalizing the kinematic likelihood parameters across the entire filter set to thereby produce normalized kinematic likelihood parameters;

weighting the normalized kinematic likelihood parameters to produce weighted normalized kinematic likelihood parameters; and combining the weighted normalized kinematic likelihood parameters so that each filter hypothesis has a normalized total maximum likelihood value. In this particular mode, the step of normalizing the kinematic likelihood parameters across the entire filter set comprises the steps of:

computing the sum $\sigma_k$, of the LLH values for each parameter across all filter hypothesis $$\sigma_k = \sum_{j=1}^{N} LLH^j(k) \quad (42)$$

where:

k=LLH parameter, (speed, altitude, fpa, etc.);

j=Filter hypothesis; and $\sigma_k$=sum of LLH values for parameter k for N filter outputs; and normalizing the likelihood values for each filter hypothesis j by $$LLH^j(k) \Longleftarrow \frac{LLH^j(k)}{\sigma_k} \quad (43)$$

The step of weighting the normalized kinematic likelihood parameters may comprise the steps of:

selecting weighting parameters for each LLH parameter such that the sum of the weights equals unity or 1 by $$\sum_{i=1}^{k} W_i = 1 \quad (44)$$

computing the weighted maximum likelihood value WMLH for each filter hypothesis $$WMLH(j) = \sum_{i=1}^{k} MLH^j(i) W_i \quad (45)$$

where:

j corresponds to filter hypothesis j; and i corresponds to LLH parameter i for filter hypothesis j. This mode may further comprise the step of deeming that filter hypothesis associated with the maximum value of weighted maximum likelihood to be the correct hypothesis. This in turn may be accompanied by the step of identifying the missile type of the target missile to be that missile type associated with the correct filter hypothesis.

A method for identifying a missile according to another aspect of the invention comprises the steps of receiving radar returns from a missile to thereby generate a plurality of position measurements constituting a target missile track, and providing a plurality of nominal missile parameters for each missile type which is of interest. Each of the nominal missile rocket parameters for each missile type which is of interest is applied to a separate boost phase filter of a set of plural boost phase filters. The track is applied to each boost phase filter of the set of plural boost phase filters, to thereby generate a plurality of state estimates, one for each missile type of interest. The output of each of the boost phase filters is processed with the nominal missile rocket parameters applied to the boost phase filter, to generate at least one maximum likelihood value for each filter parameter and missile type of interest. For each of the maximum likelihood values, the sum is computed across all the missile types of interest. The likelihood values for all missile types of interest are normalized to thereby generate normalized likelihood values. Weighting parameters are selected for each likelihood parameter, such that the sum of the weights for each parameter equals unity. The weighted maximum likelihood value for each missile type of interest is determined. That missile represented by the filter exhibiting the maximum likelihood value is selected as being the correct missile.

BRIEF DESCRIPTION OF THE DRAWING

FIG. 3 is a tabular representation of nominal target templates listing nominal values of boost acceleration, speed, altitude, and angle of attack as a function of time after launch, for a particular known type of target;

FIGS. 10*a*, 10*b*, 10*c*, and 10*d* plot estimated time to burnout as a function of time in target flight arising from selection of various hypotheses of the arrangement of FIG. 4;

FIG. 11 is a simplified diagram in block and functional form, illustrating a system according to an aspect of the invention, coacting with a template-based prediction arrangement which uses nominal templates to estimate future thrust acceleration, position, and velocity vectors associated with a target missile, to perform identification of the target missile type;

FIG. 12 is an example of the basics of a nominal target template which may be used in conjunction with the invention;

DESCRIPTION OF THE INVENTION

Figure 8A:
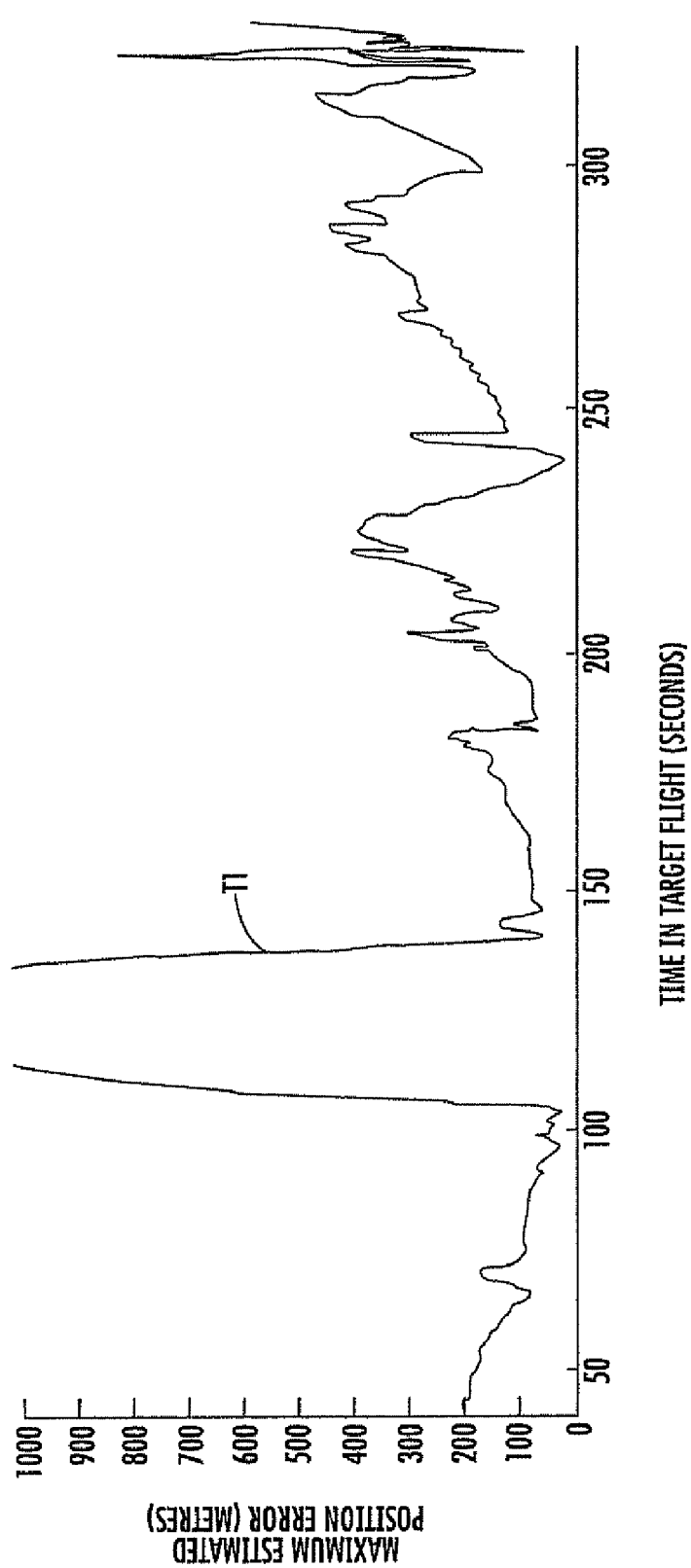
FIGS. 8a, 8b, 8c, and 8d plot maximum estimated position errors as a function of time in target flight arising from selection of various hypotheses of the arrangement of FIG. 4.
Figure 8B:
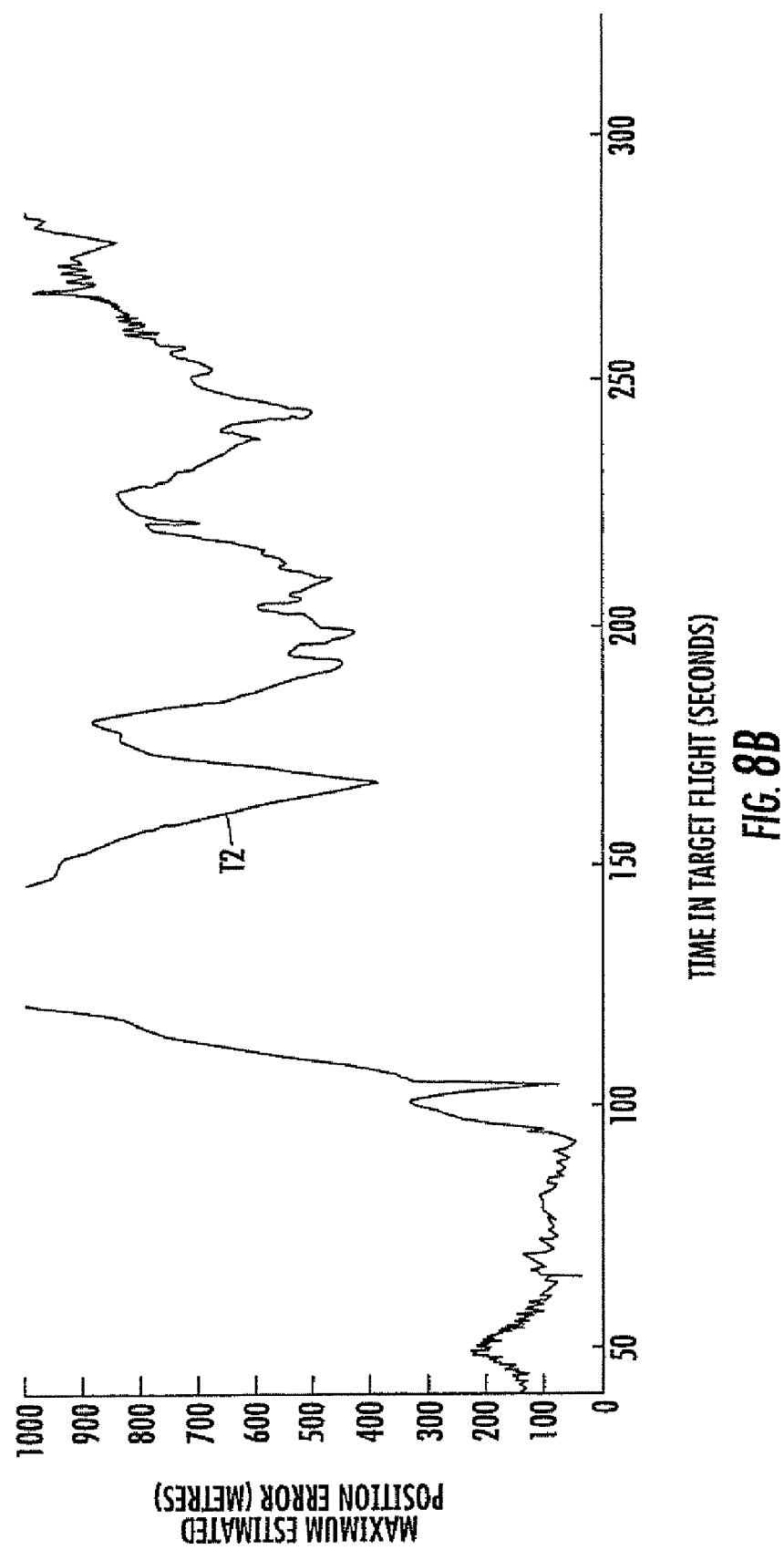
Figure 8C:
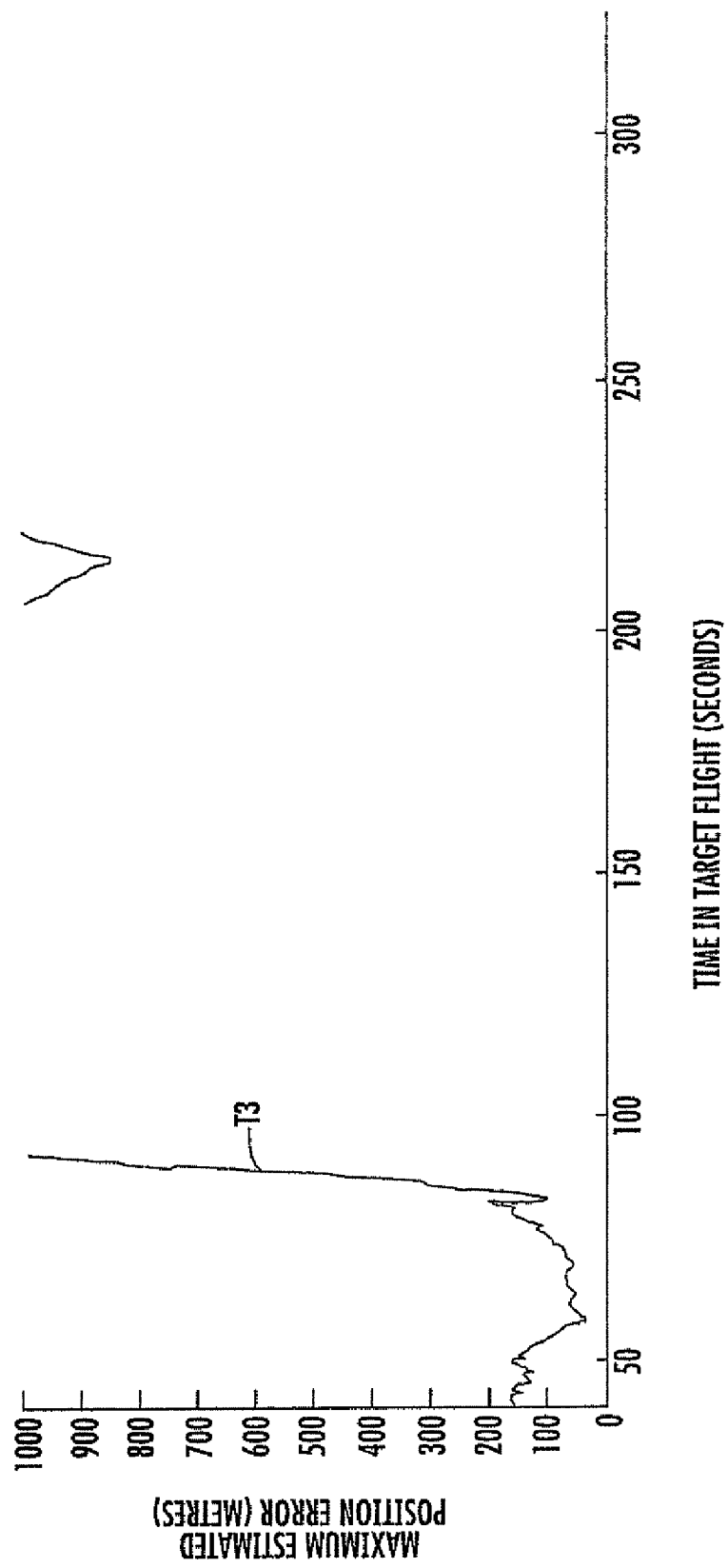
Figure 8D:
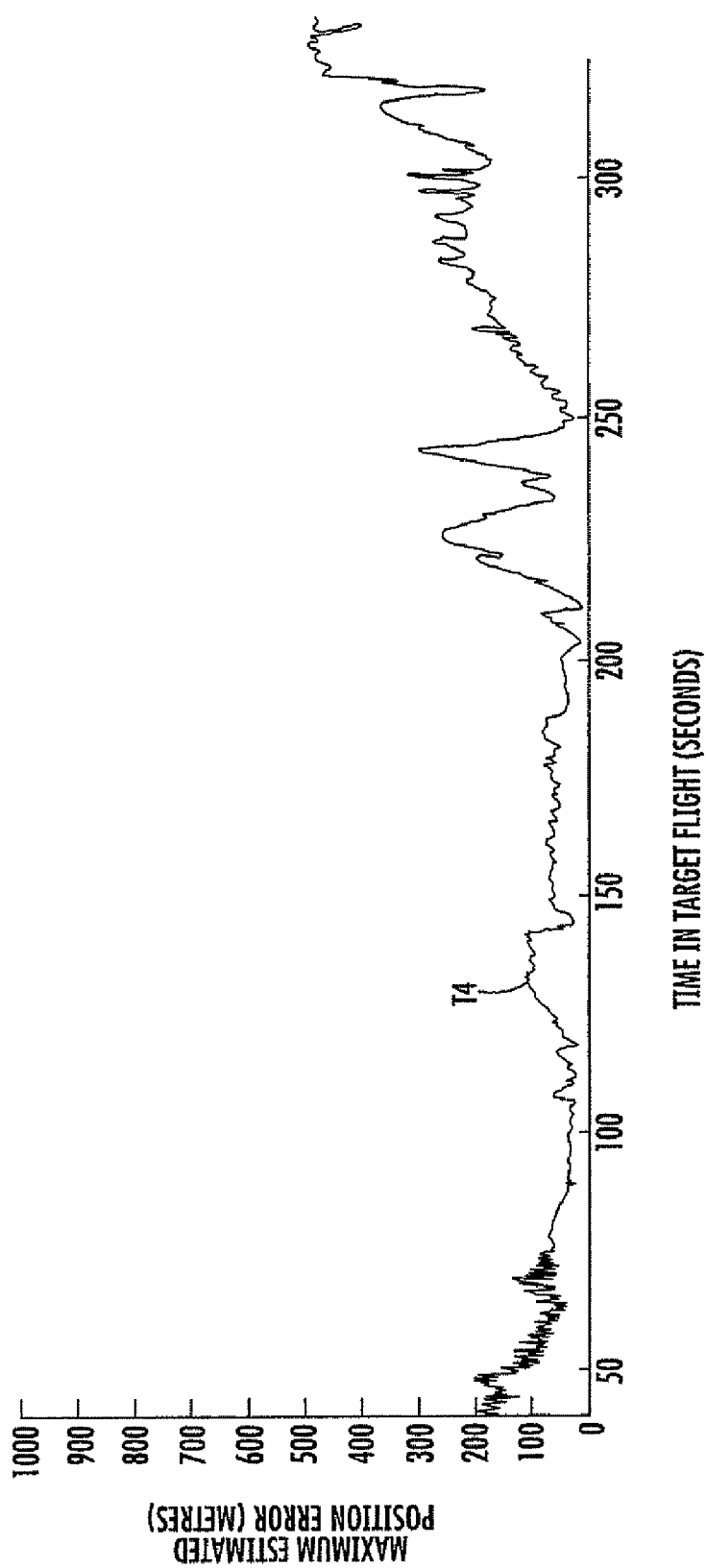
Figure 9A:
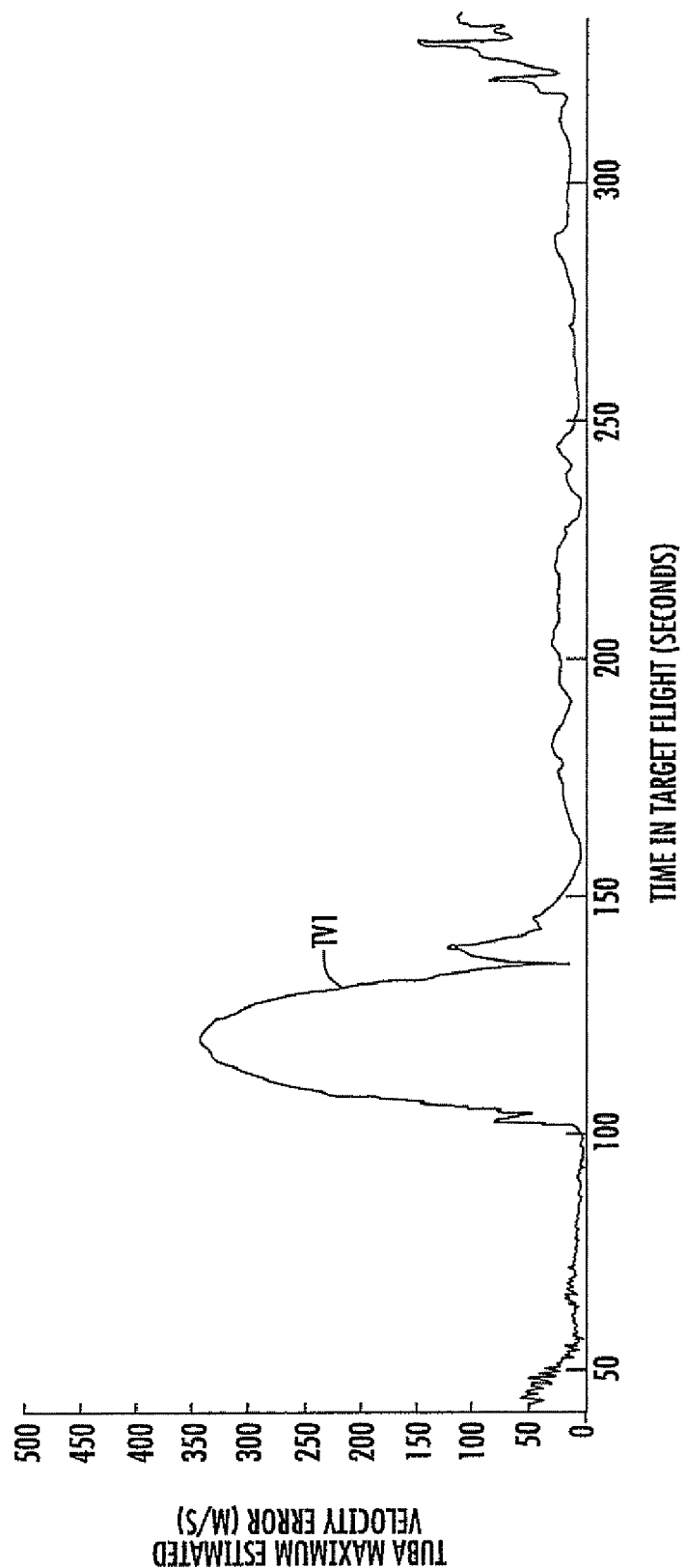
FIGS. 9a, 9b, 9c, and 9d plot maximum estimated velocity errors as a function of time in target flight arising from selection of various hypotheses of the arrangement of FIG. 4.
Figure 9B:
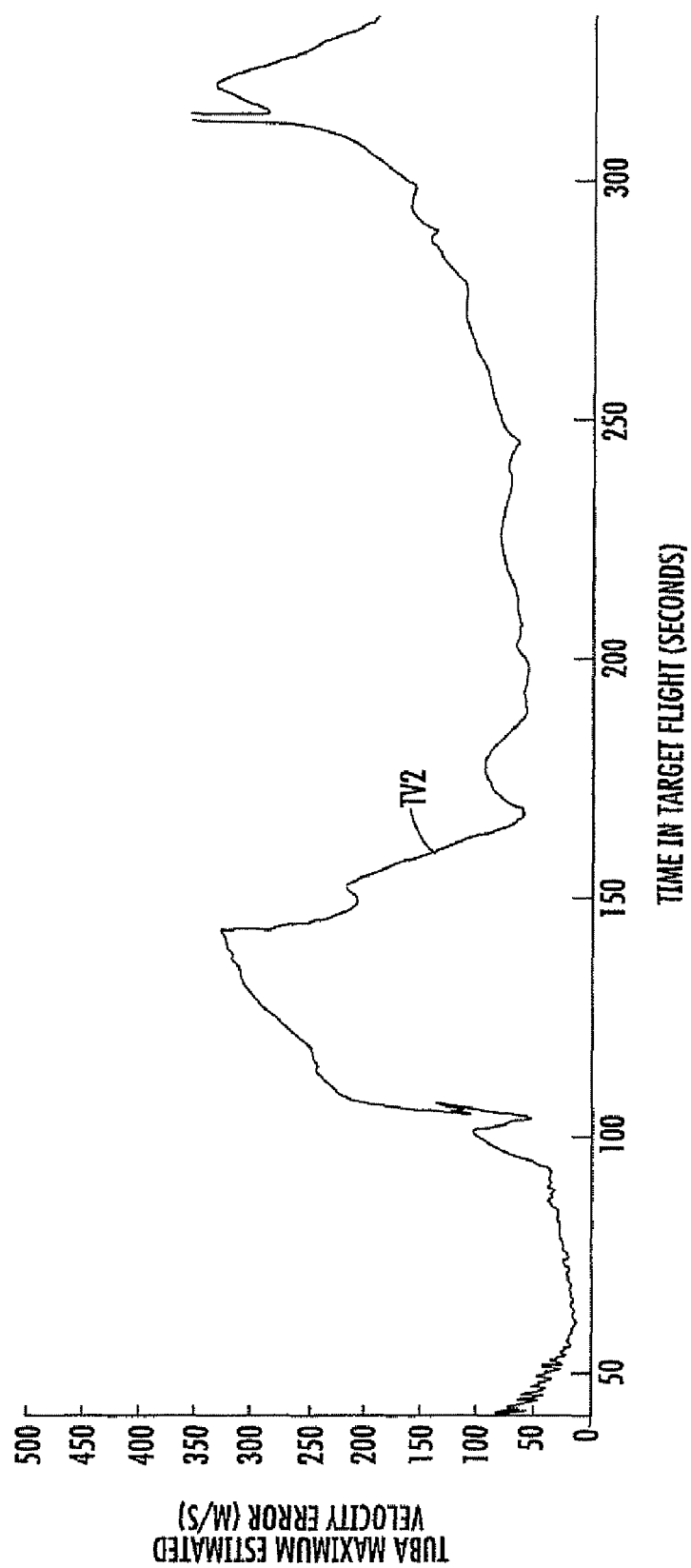
Figure 9C:
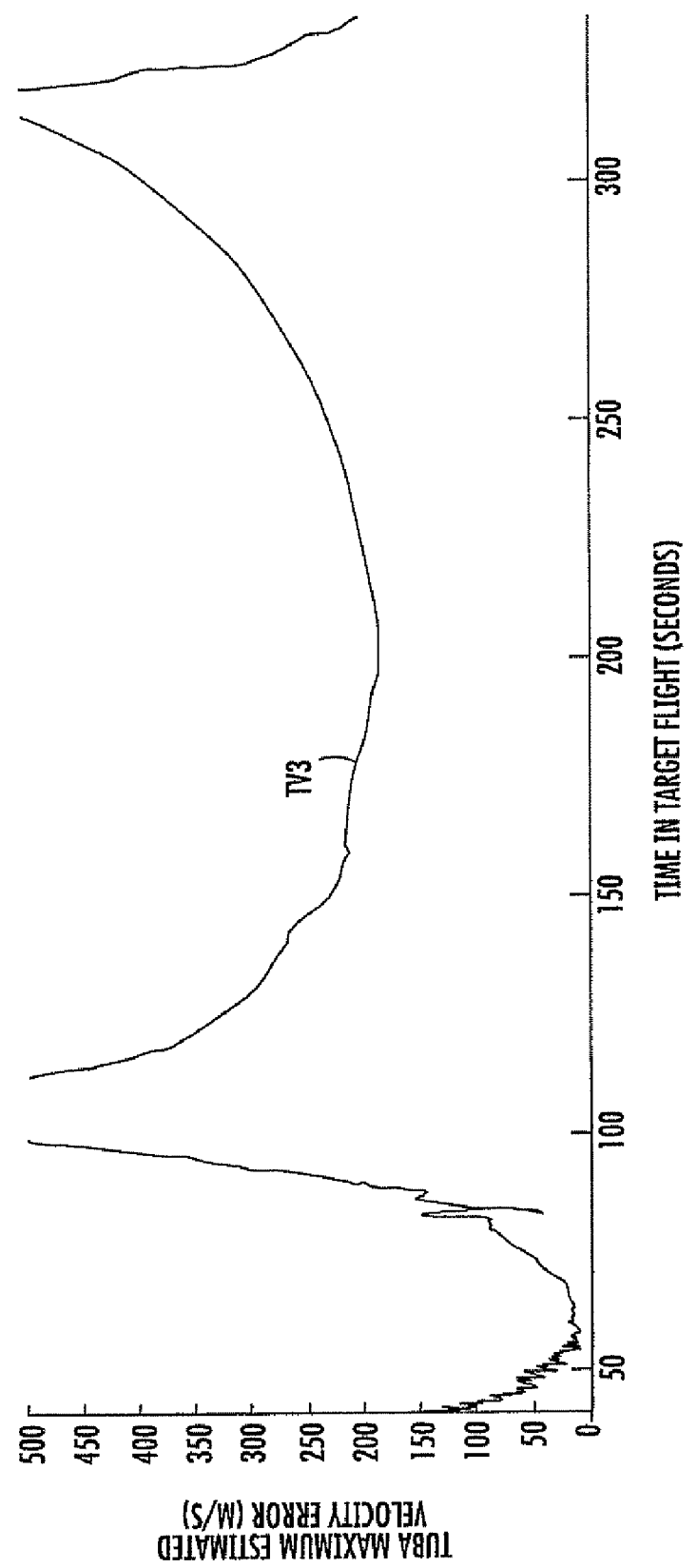
Figure 9D:
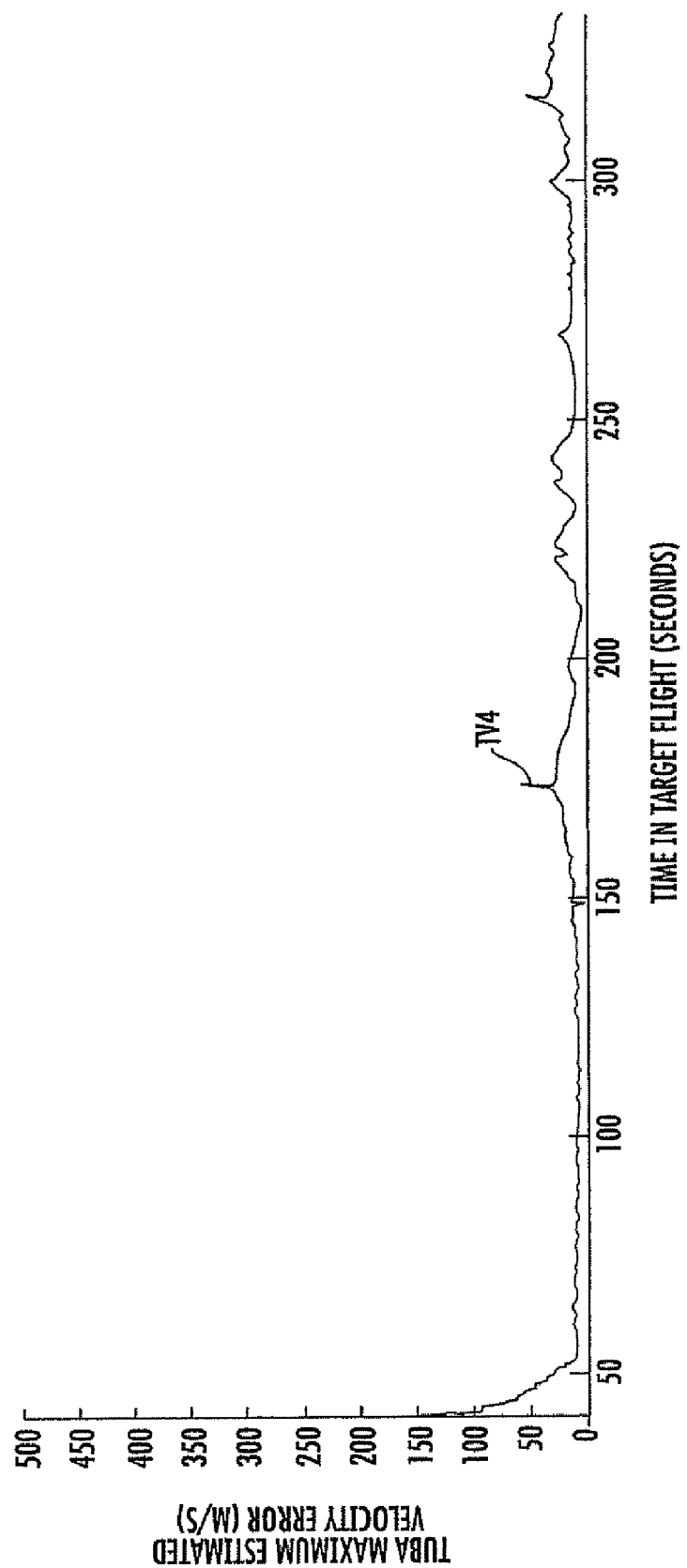

Various multi-hypothesis boost phase filter methods have been developed to track boosting ballistic missiles, some with promising results, including TUBA. However, at some point after the filters have settled, the correct hypothesis must be selected so that the correct filter outputs, which are the best possible predictions of the target states, can be used in a fire control system. To this end, a system according to an aspect of the invention is the Kinematic Algorithm for Rocket Motor Apperception (KARMA). KARMA is a target identification algorithm that can be used with any set of multi-hypotheses filter outputs to identify the target using nominal kinematic target parameters and kinematic states. FIGS. 8*a*, 8*b*, 8*c*, and 8*d* show plots of TUBA maximum estimated position error in meters (m) as a function of time in target flight (time of target flight) for four different templates representing four different target identifications, and FIGS. 9*a* through 9*d* show plots of TUBA maximum estimated velocity errors in meters per second (m/s) plotted against time in target flight in seconds, also representing different target identifications. FIG. 8*a* illustrates the estimated position error for hypothesis T1. In FIG. 8*a*, the maximum error of plot T1 shows an error peak of greater than 1000 meters in a range about 120 seconds. Plot T2 of FIG. 8*b* also has a peak of greater than 1000 meters, and the error after 120 seconds generally exceeds 500 meters. Plot T3 of FIG. 8*c* exceeds 1000 meters of error at most times greater than 100 seconds. FIG. 8*d* plots the position error T4 for the correct hypothesis. The maximum estimated position error in FIG. 8*d* is less than 200 meters at most times, and does not exceed about 400 meters. FIG. 9*a* plots the maximum estimated velocity error TV1 for the hypothesis corresponding to T1 of FIG. 8*a*. As illustrated in FIG. 9*a*, plot TV1 has a peak value of about 300 meters/second around target flight time of 120 seconds. Plot TV2 of FIG. 9*b* illustrates the estimated velocity error for hypothesis 2, corresponding to the hypothesis of FIG. 8*b*. In FIG. 9*b*, plot TV2 has a broad peak estimated error of about 300 meters/second in the range of 110 to 140 seconds, and another similar peak value above 300 seconds. Plot TV3 of FIG. 9*c* has a peak estimated velocity error exceeding 500 meters/second slightly above 100 seconds, and another such peak slightly above 300 seconds. Throughout most of the range, the error exceeds 200 meters/second. By contrast, the maximum estimated velocity error in the correct hypothesis of plot TV4 of FIG. 9*d* is less than 50 meters/second above 50 seconds. The importance of selecting the proper hypothesis from among the templates is clear.

Figure 10A:
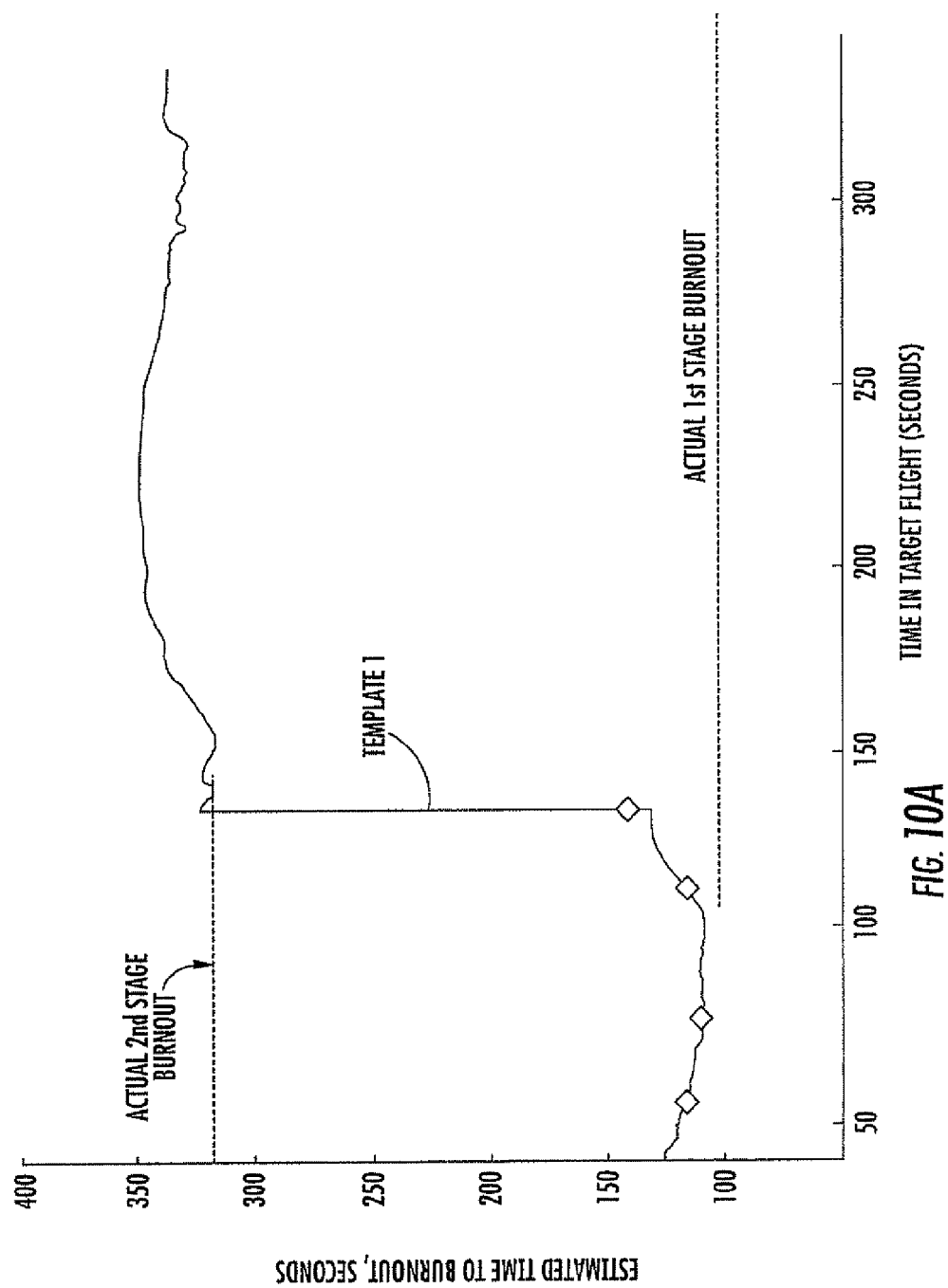
Figure 10B:
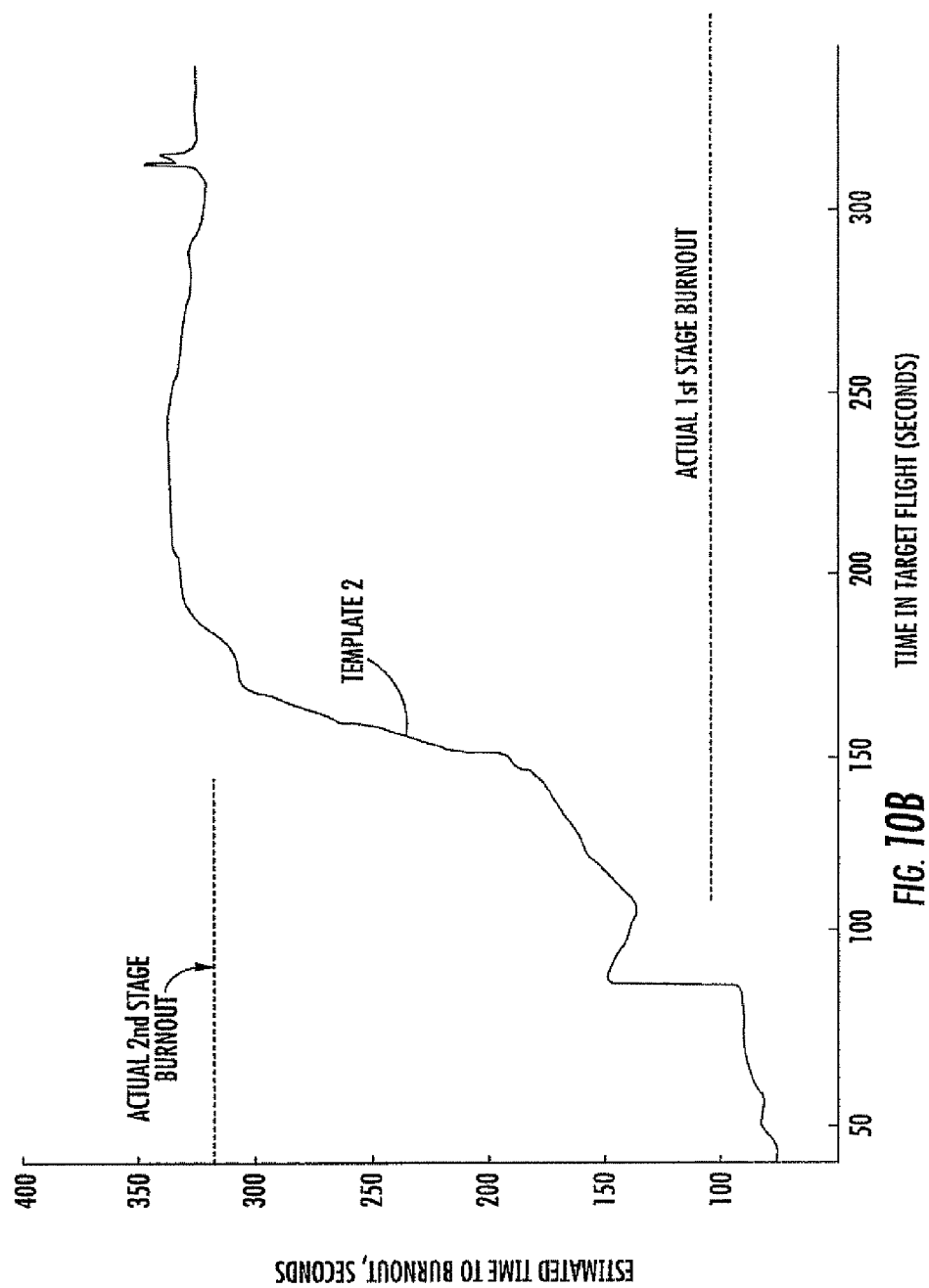
Figure 10D:
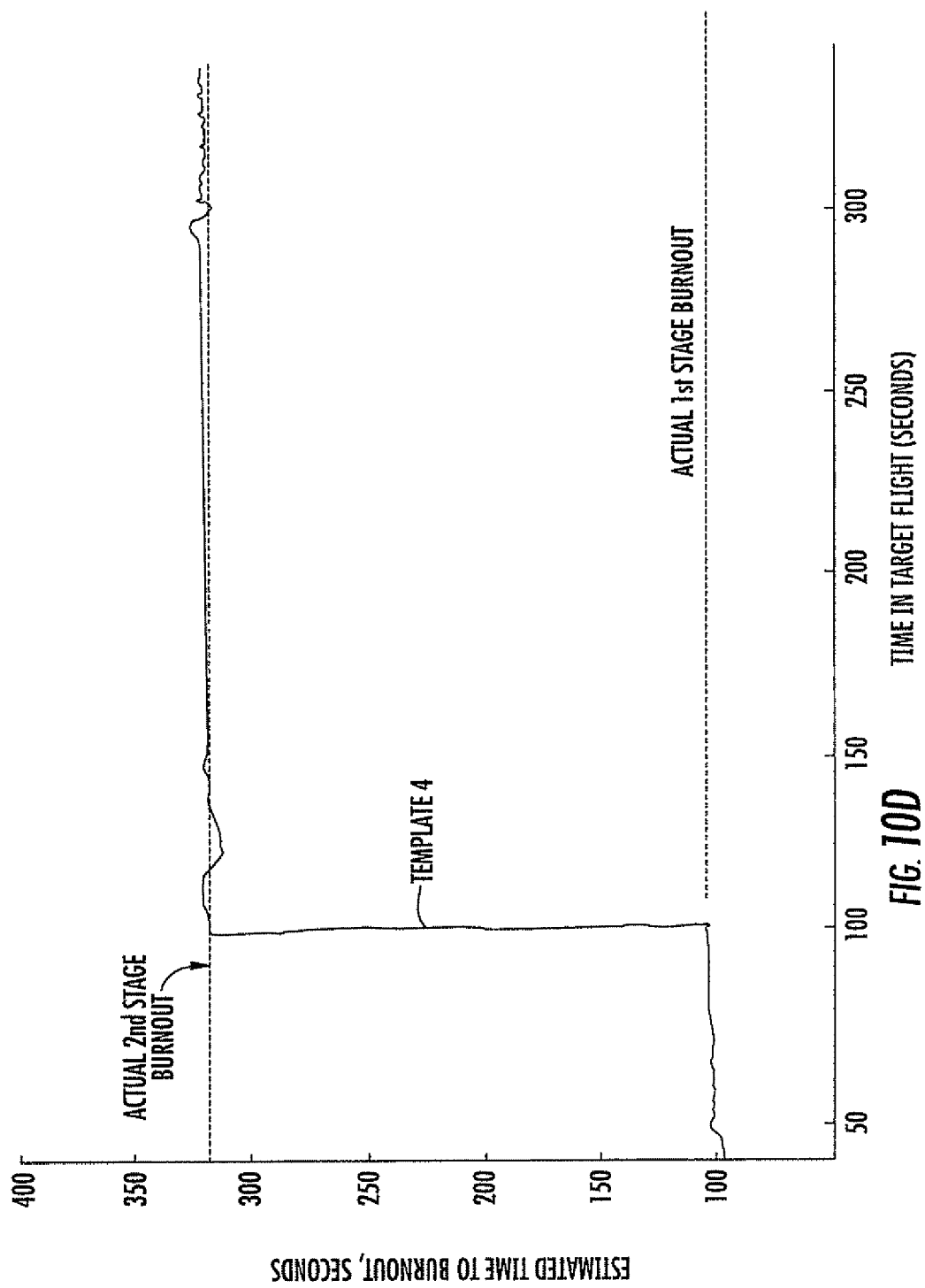
Figure 17:
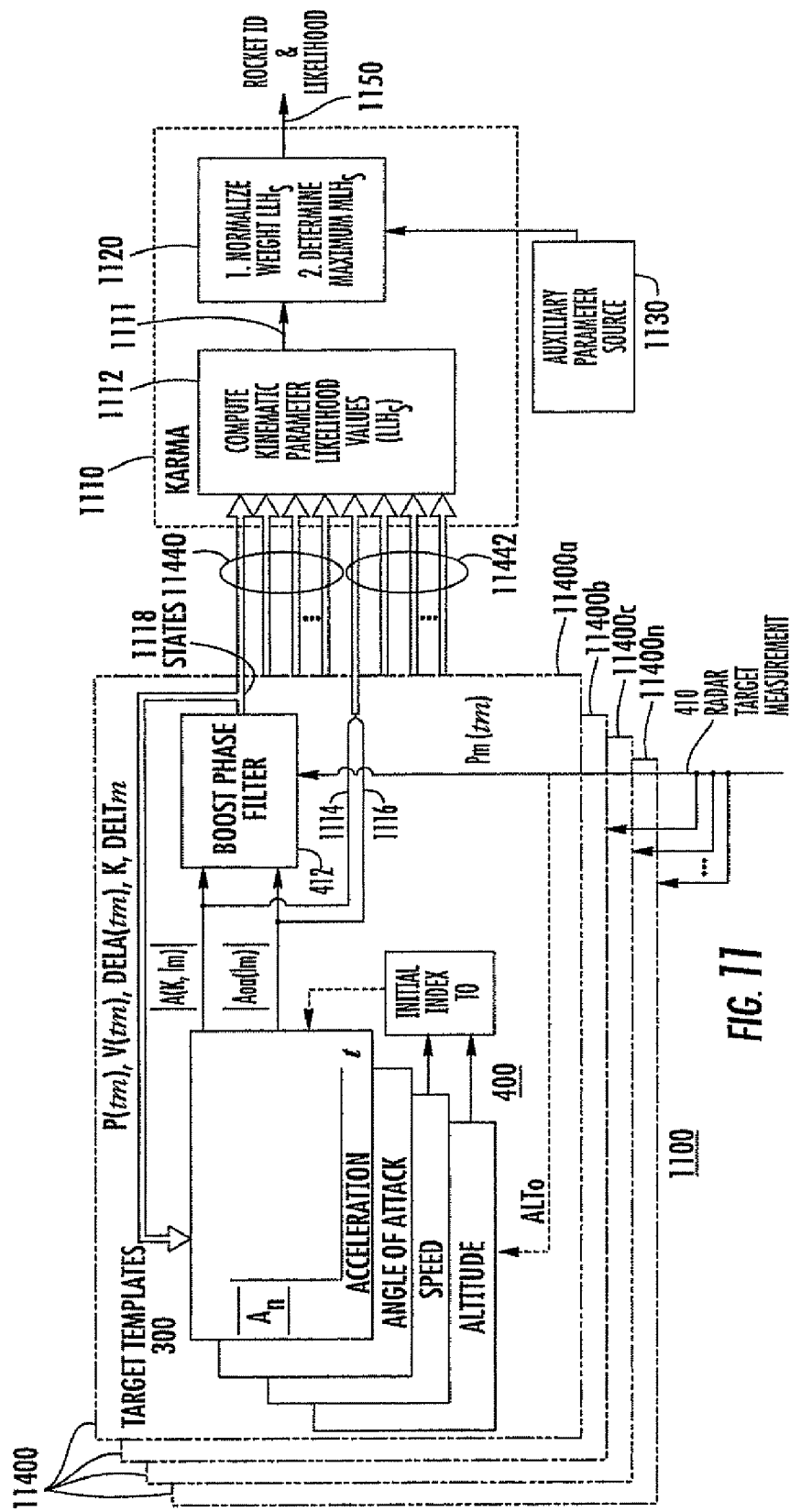

FIGS. 10*a*, 10*b*, 10*c*, and 10*d* are plots illustrating estimated burn out (BO) times for templates corresponding to the four TUBA position templates associated with FIGS. 8*a*, 8*b*, 8*c* and 8*d* and the four TUBA velocity templates associated with FIGS. 9*a*, 9*b*, 9*c*, and 9*d*. In FIGS. 10*a*, 10*b*, 10*c*, and 10*d* the first-stage burnout occurs at 100 seconds of target flight, and the second-stage burnout occurs at about 320 seconds. In other words, the first stage burns for 100 seconds and the second stage burns for about 220 seconds. FIG. 10*a* illustrates a plot Template 1 that shows an estimated time to first-stage burnout beginning at a time a bit more than 50 seconds after launch. At a time 50 seconds after launch of the target, the estimated time of burn-out of the first stage is about 125 seconds after launch. The plot for template 1 as illustrated in FIG. 10*a* drifts in the range of about 110 seconds to 140 seconds until a time of target flight of about 125 seconds, when it makes a sharp transition to an estimated time-to-second-stage burnout of about 320 seconds. Note that the actual first-stage burnout is at about 100 seconds, and the estimated value ranges from about 130 seconds down to 110 seconds in the time range up to 100 seconds. Even after the 100-second time of first stage burnout, the estimated value rises until about 130 seconds. Template 2 of FIG. 10*b* shows that the estimated first stage burnout is too low until about 80 seconds, and there is no distinct transition to the second-stage burnout estimate. Template 3 of FIG. 10*c* continues to estimate burnout at about 90 seconds throughout the flight, and shows no transition whatever. Template 4 of FIG. 10*d* is the correct hypothesis. FIG. 10*d* provides the correct first-stage burnout value from time 50 seconds to time 100 seconds, and makes a sharp transition to the correct second-stage burnout value. Clearly, template 4 is the best predictor of first and second stage burnout. Filter outputs from the other hypotheses (template 1, template 2, template 3), which do not correspond to the actual target in track, show large errors. Using any of these other outputs would result in invalid or at least degraded fire control solutions. Thus, the ability to identify the target (the correct hypothesis output) from a multi-hypotheses filter is an important part of any Boost phase intercept system.

Figure 1:
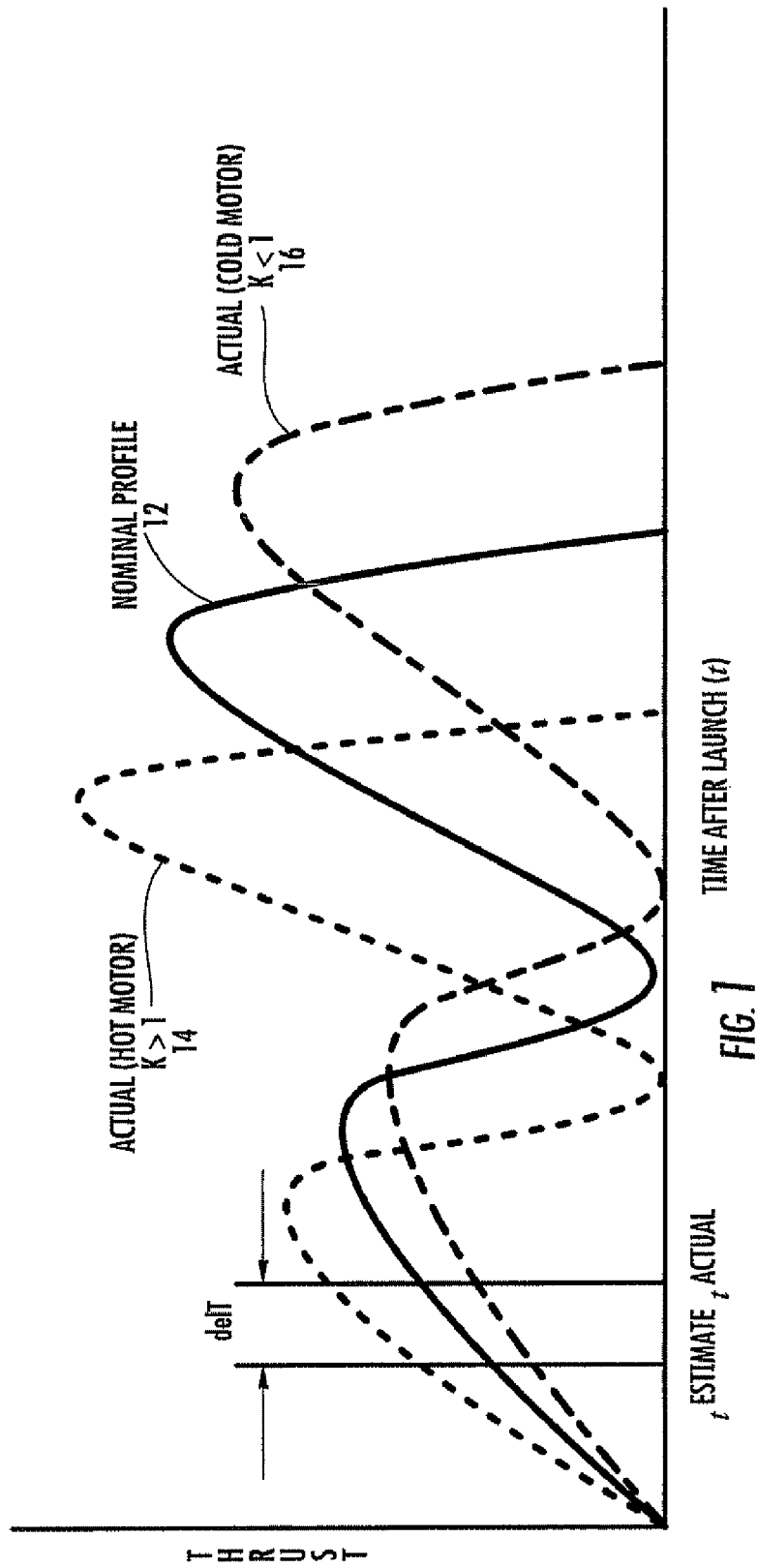
FIG. 1 illustrates variations in target thrust acceleration profiles due to motor variations as described in U.S. patent application Ser. No. 11/189,234 filed Jul. 26, 2005 in the name of Luu et al.
Figure 2:
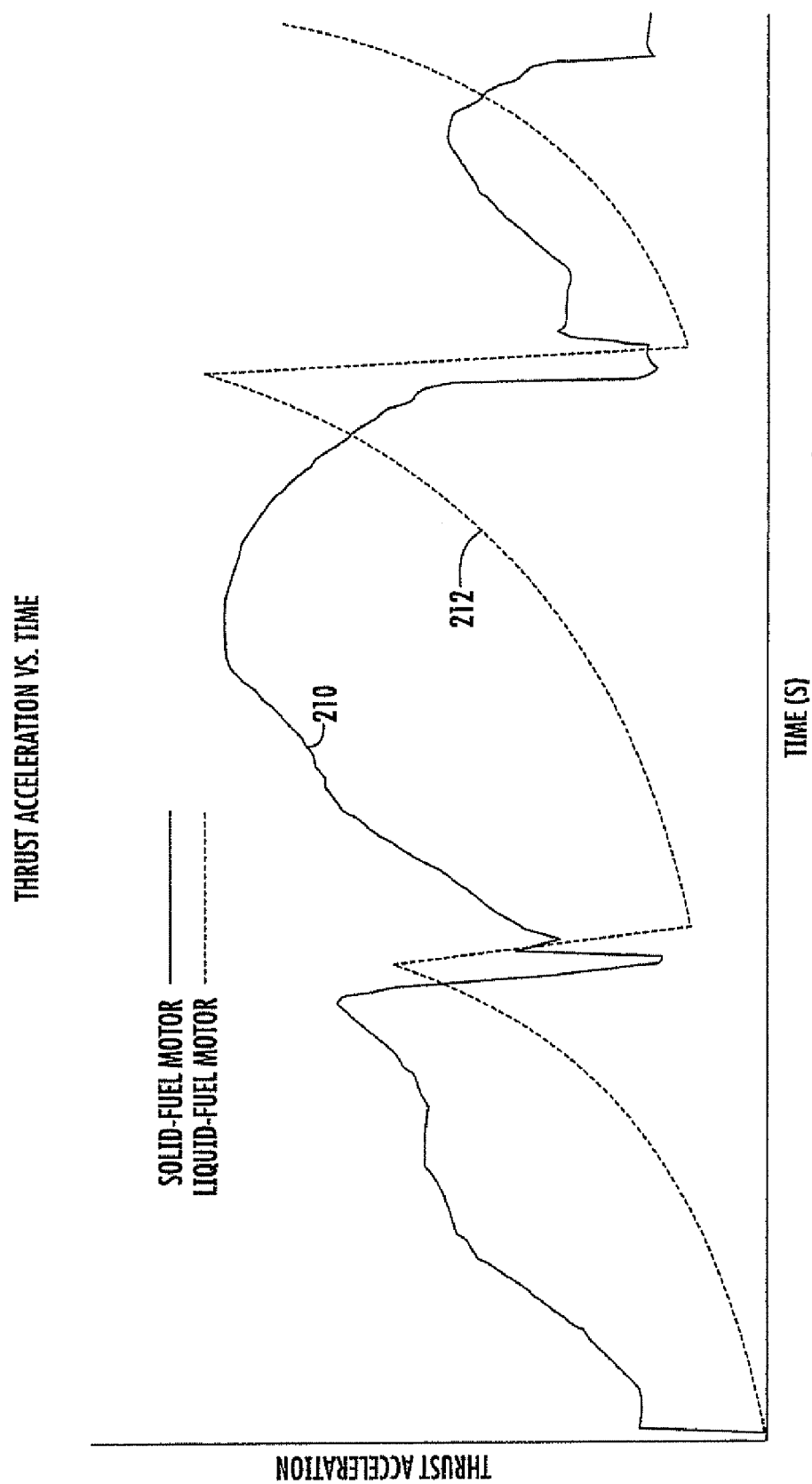
FIG. 2 illustrates typical thrust acceleration profiles for solid- and liquid-fuel motors as described by Luu et al.
Figure 4:
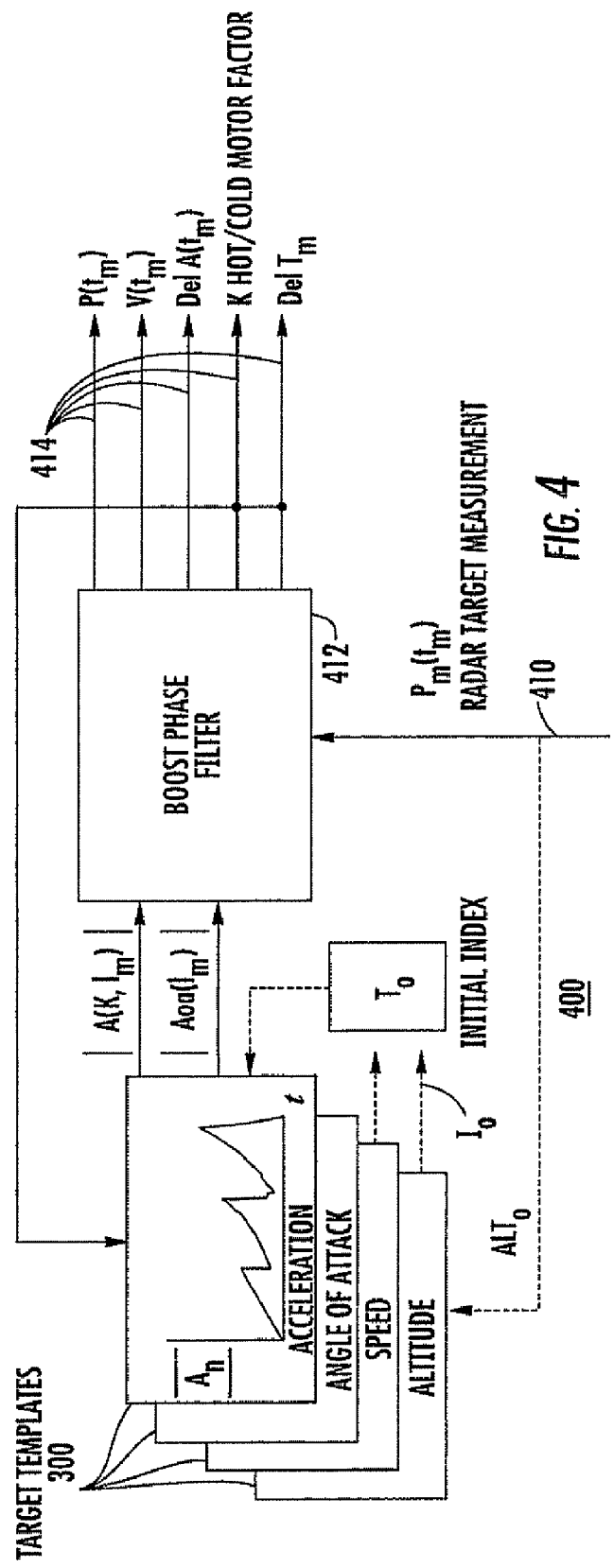
FIG. 4 is a simplified functional block diagram of a template updated boost state estimating arrangement according to an aspect of the method of Luu et al. application Ser. No. 11/189,234.
Figure 5:
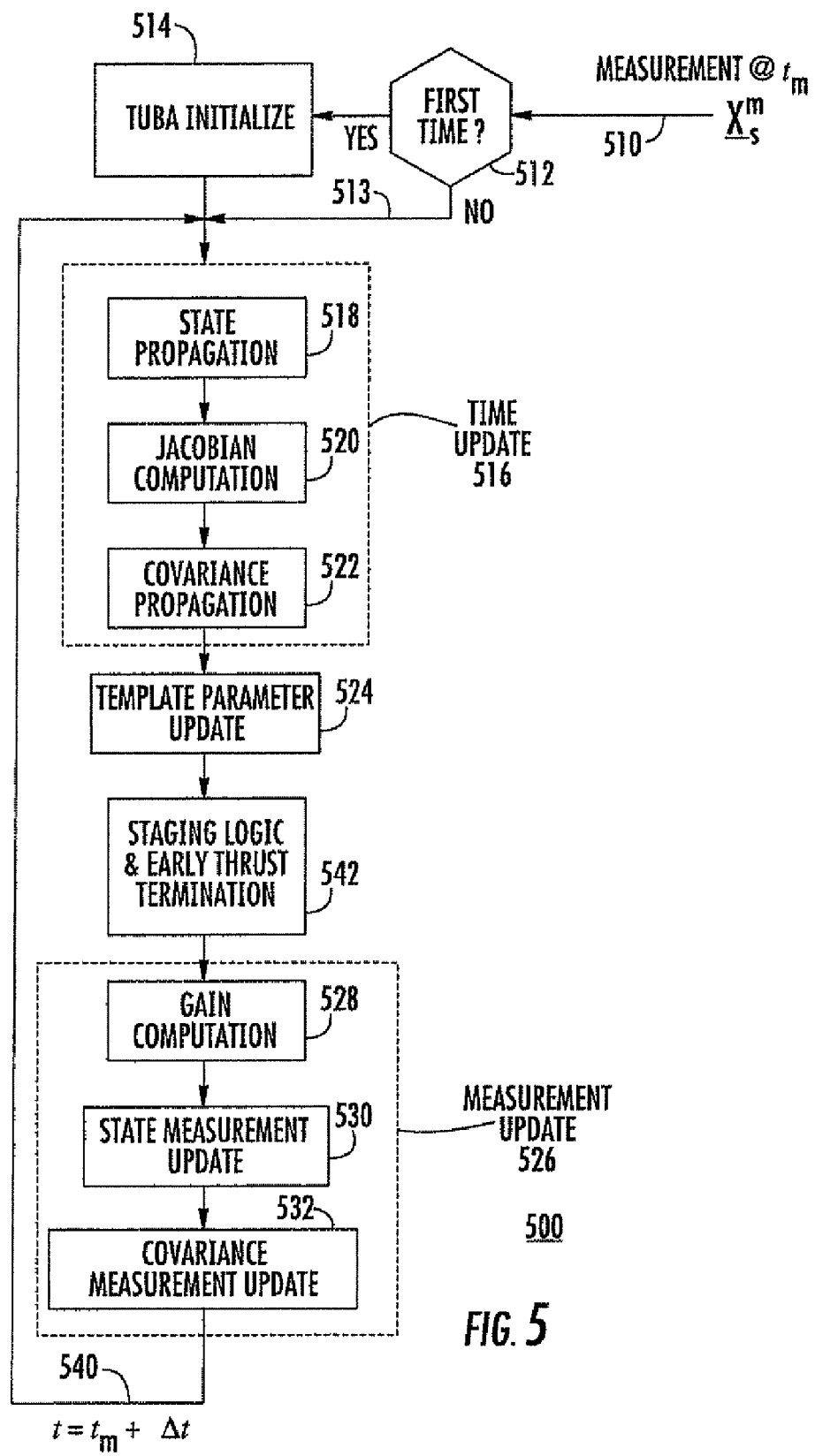
FIG. 5 is a simplified logic flow chart or diagram illustrating computer processing which implements the template updated boost algorithm used in FIG. 4.
Figure 6:
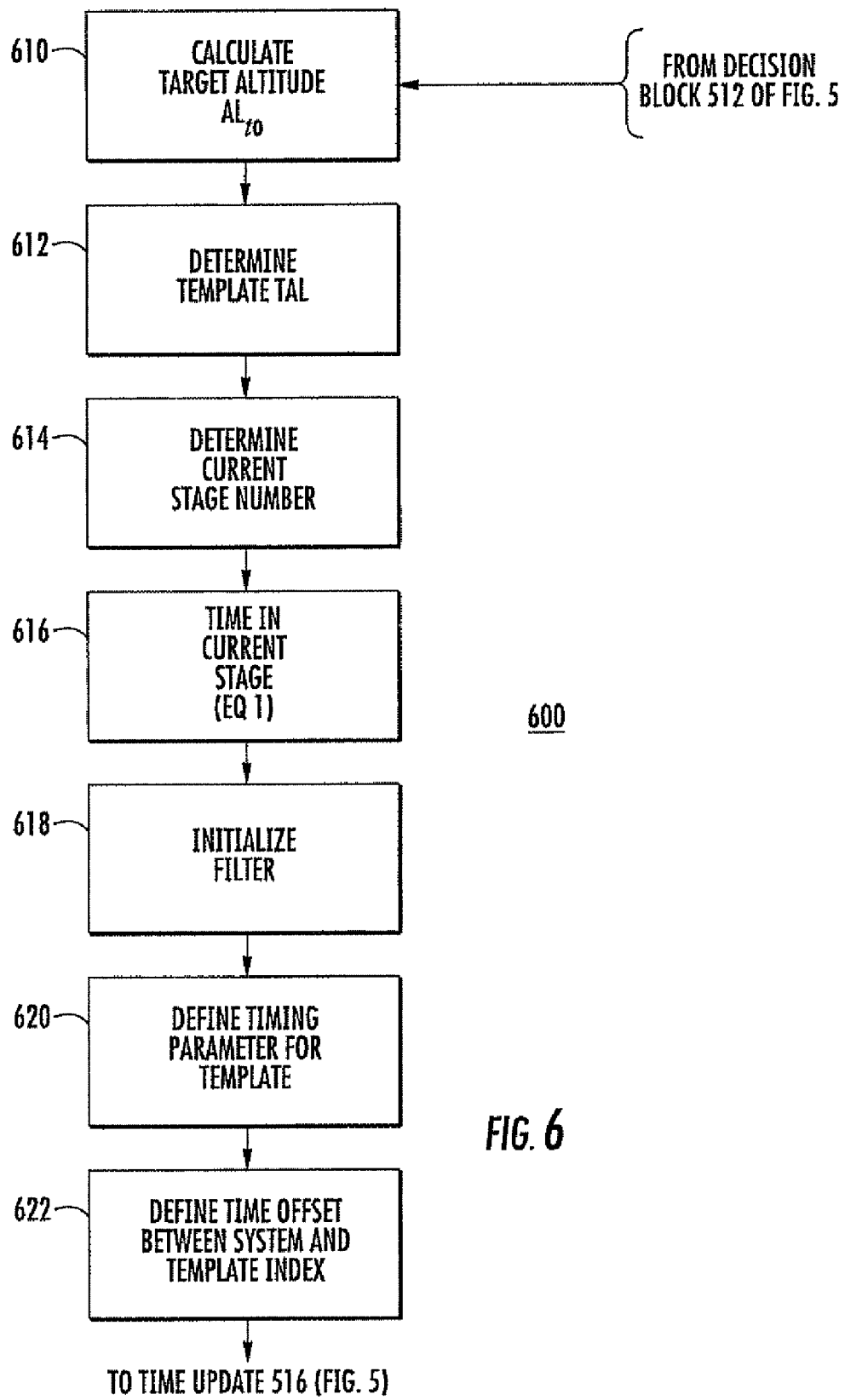
FIG. 6 is a simplified logic flow chart or diagram illustrating an initialization portion of the logic of FIG. 5.
Figure 7:
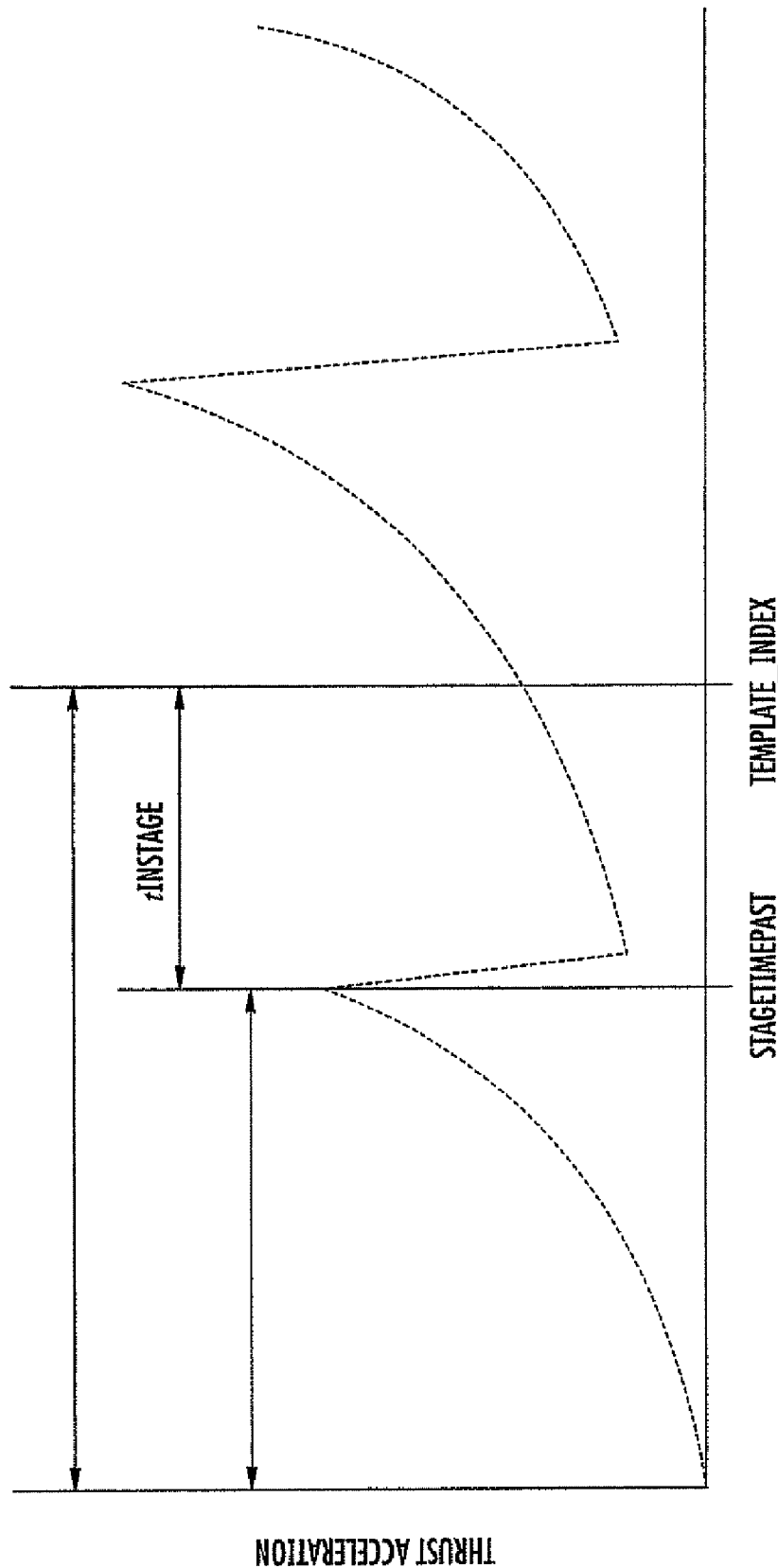
FIG. 7 illustrates a nominal thrust acceleration template versus time after launch as described by Luu et al., to aid in defining certain parameters.

A system according to an aspect of the invention is the Kinematic Algorithm for Rocket Motor Apperception (KARMA). KARMA is a target identification algorithm that can be used with any set of multi-hypotheses filter outputs to identify the target using nominal kinematic target parameters and kinematic states. FIG. 11 is a simplified diagram in block and functional form, illustrating a KARMA system 1100 according to an aspect of the invention, coacting with a template-based prediction arrangement 11400 which uses nominal templates to estimate future thrust acceleration, position, and velocity vectors associated with a target missile, to perform identification of the target missile type. The specific template-based prediction arrangement feeding KARMA, as illustrated in FIG. 11 for purposes of illustration, is a plurality 11400 of the TUBA multi-hypotheses filtering algorithm or estimators 400 of FIG. 4, redesignated as 11400*a*, 11400*b*, 11400*c*, ..., 11400N. According to this aspect of the invention, KARMA receives estimates from a plurality 11400 of TUBA processors corresponding to 400 of FIG. 4, each of which generates its estimates based upon a hypothesis of the nature of the target. KARMA 1100 of FIG. 11 provides at an output path 1150 target identification against (in the case of) both solid- and liquid-rocket motor targets, thereby providing a robust capability in the presence of hot and cold rocket engines and in the absence of prior typing knowledge. This is accomplished in KARMA by accounting for statistical variations in rocket motor performance and trajectory deviations. In FIG. 11, KARMA system 1100 includes a KARMA algorithm designated as 1110, which may be implemented, as known, by computer processing. A block 1112 of KARMA algorithm 1110 receives Boost acceleration AB(K, $I_m$) and Angle of Attack AOA($I_m$) from each of the TUBA templates 300 by way of paths corresponding to paths 1114 and 1116, respectively, of a path set 11442. Block 1112 of KARMA algorithm 1110 also receives from each boost phase filter 412, by way of a path 1118 of set of paths 11440, the position states P($t_m$), velocity states V($t_m$), estimated error delA($t_m$) in angle of attack, error delT in the time index into the template, and scalar (hot/cold) motor variation factor, K. Block 1112 of KARMA algorithm 1110 computes kinematic parameter likelihood values (LLHs), and makes them available on a path 1111. The kinematic parameter likelihood LLH values are provided to a further KARMA block 1120, which processes the information to (1) normalize the weight of the LLHs, and (2) determine the maximum value of the likelihoods (MLHs) to thereby identify the type of rocket and the associated likelihood. Normalizing the weight of the LLHs is a required intermediate step before computing the Maximum Likelihoods. The Rocket ID is the target template ID corresponding to the filter that produces the Largest Likelihood value. The missile or rocket identification, selected from among those processed in set 11400 of TUBA processors 400 of FIG. 11, is produced on a path 1150. Additional information from sources, such as auxiliary parameter source 1130, other than the template-based multi-hypotheses filtering algorithm or estimator 400, may also be used by the KARMA algorithm 1110.

In the arrangement of FIG. 11, each filter hypothesis (300 of FIG. 3) from one of the multi-hypotheses filter set 400 feeds its target state estimates and covariances into KARMA 1110. For each hypothesis, a likelihood value for kinematic parameters such as altitude, speed, and flight path angle is calculated in a KARMA block 1112 based on the filter output states, covariances and nominal kinematic values. In block 1120 the likelihood parameters are normalized across all the filter hypotheses and combined in a weighted scheme, and a maximum likelihood (MLH) value is calculated for each kinematic parameter of interest. Some kinematic parameters which may be suitable include speed, altitude, and flight path angle. Other parameters can be added if the estimate and nominal values for that parameter are readily available. The maximum likelihood values show the likelihood that the current hypothesis or nominal template is the correct hypothesis based on the estimated parameter's variance from its nominal template value. The filter hypothesis with the largest combined normalized and weighted likelihoods is selected as the target in track.

The inputs to the KARMA algorithm 1110 of FIG. 11 from boost phase filter 412 include estimated rocket kinematic filter states and covariances from each filter hypothesis of the multi-hypotheses boost phase filters. The filter states and covariances include (but are not limited to):

$$\underline{s} = \begin{Bmatrix} Z \\ \dot{Z} \\ TALest \end{Bmatrix} \quad (36)$$

where:
Z is the target position vector (m), Earth-Centered Earth-Fixed (ECEF);
$\dot{Z}$ is target velocity vector (m/s), ECEF; and TALest is current time index into the nominal template(s) and $$P = \begin{Bmatrix} P_{ZZ} \\ P_{\dot{Z}\dot{Z}} \\ P_{TALest} \end{Bmatrix} \quad (37)$$

where:
$P_{ZZ}$ is the 3×3 position covariance matrix;
$P_{\dot{Z}\dot{Z}}$ is 3×3 velocity covariance matrix; and
$P_{TALest}$ is the covariance of error in time index estimate.

The speed likelihood parameter (speed LLH) computation which takes place in block 1112 of FIG. 11 is based on receiving the nominal target template data that each filter hypothesis assumes. This data is typically stored as a function of the target Time After Launch (TAL) as shown in the single template of FIG. 12, and is retrieved using a time index or TAL estimate from the filter. The table of FIG. 12 indicates that for the particular missile hypothesis of the table, the boost acceleration AB, the speed V, altitude Alt, and flight path angle FPA at a particular time after launch (TAL) are the given values. More particularly, at time $T_1$ after launch, the boost acceleration is $AB_1$, the speed is $V_1$, the altitude is $Alt_1$, and the flight path angle is $FPA_1$. The acceleration, speed and altitude are likely to be less at time T1 than at other later times.

The calculation of the speed likelihood parameter (speed LLH) in block 1112 of FIG. 11 for each filter hypothesis j is calculated in the form of a corresponding computer parameter MLHSpeed $$MLHSpeed(j) = \frac{1}{\sqrt{2\pi(P_{Speed} + P_{STemplate})}} e^{\left(\frac{-\frac{1}{2}delSpeed^2}{(P_{Speed} + P_{STemplate})}\right)} \quad (38)$$

where:

$$P_{Speed} = \frac{\dot{Z}' P_{\dot{Z}\dot{Z}} \dot{Z}}{\dot{Z}' \dot{Z}}$$

is the covariance of the magnitude of $\dot{Z}$;

$$P_{STemplate} = \left(\frac{STemplate(TALest - dt) - STemplate(TALest)}{dt}\right)^2 P_{TALest}$$

is the covariance of the speed from the nominal template lookup;
delSpeed=Speed(j)−STemplate(TALest) is the speed difference between the filter value and the template value; and
dt=0.1 is a small time increment.

The altitude likelihood parameter MLHAlt(j) is computed in block 1112

$$MLHAlt(j) = \frac{1}{\sqrt{2\pi(P_{Alt} + P_{AltTemplate})}} e^{\left(\frac{-\frac{1}{2}delAlt^2}{(P_{Alt} + P_{AltTemplate})}\right)} \quad (39)$$

where:

$$P_{Alt} = \frac{Z' P_{ZZ} Z}{Z' Z}$$

is the covariance of the target altitude;

$$P_{AltTemplate} = \left(\frac{AltTemplate(TALest - dt) - AltTemplate(TALest)}{dt}\right)^2 P_{TALest}$$

is the covariance of the speed from the nominal template lookup;

$$P_{AltTemplate} = \left(\frac{AltTemplate(TALest - dt) - AltTemplate(TALest)}{dt}\right)^2 P_{TALest}$$

is the covariance of the speed from the nominal template lookup; and dt=0.1 is some small time increment.

The calculation for Flight Path Angle likelihood parameter in block 1112 of FIG. 11 likelihood is generally similar to the calculations for speed likelihood parameter and altitude likelihood parameter. However, since flight path angle is calculated from the filter states, the covariance term is more complicated. The Flight Path Angle Likelihood MLHFpa is calculated using $$MLHFpa(j) = \frac{1}{\sqrt{2\pi(P_{Fpa} + P_{FpaTemplate})}} e^{\left(\frac{-\frac{1}{2}delFpa^2}{(P_{Fpa} + P_{FpaTemplate})}\right)} \quad (40)$$

where:

Fpa is the covariance of the magnitude of the flight path angle.

The likelihood parameter for flight path angle uses the cosine of the flight path angle $$\cos\theta = \frac{Z'\dot{Z}}{|Z||\dot{Z}|}$$

and the flight path angle in radians Fpa=$\pi$-$\cos^{-1}$(cos $\theta$). Given these definitions, the likelihood parameter $P_{Fpa}$ for flight path angle is given by $$P_{Fpa} = TT \ast (T'_p P_{ZZ} T_p + T_v' P_{\dot{Z}\dot{Z}} T_v + T'_p P_{Z\dot{Z}} T_v + T_v' P_{\dot{Z}Z} T_p) \quad (41)$$

where:

$$TT = \frac{1}{(1 - \cos^2\theta) \ast |Z||\dot{Z}|};$$

$$T_P = \frac{(Z \cdot \dot{Z})Z}{Z \cdot Z} - \dot{Z}; \text{ and}$$

$$T_V = \frac{(Z \cdot \dot{Z})\dot{Z}}{\dot{Z} \cdot \dot{Z}} - Z$$

$$P_{FpaTemplate} = \left(\frac{FpaTemplate(TALest - dt) - FpaTemplate(TALest)}{dt}\right)^2 P_{TALest}$$

is the covariance of the nominal flight path angle template lookup;

delFpa=Fpa(j)−FpaTemplate(TALest) is the flight path angle difference between the filter value and the template value; and dt=0.1 is some small time increment.

As described above, the speed likelihood parameter speed MLH or MLHSpeed, altitude likelihood parameter MLHAlt, and Flight Path Angle Likelihood MLHFpa are determined in block 1112 of FIG. 11 for each filter hypothesis. Once the kinematic likelihood parameters have been calculated, the likelihoods are made available by a path 1111 to block 1120, where they are normalized across the entire filter set, weighted, and combined so that each filter hypothesis will have a normalized total Maximum likelihood value. The first step performed in block 1120 is to compute the sum $\sigma_k$ of the LLH values for each parameter across all filter hypothesis $$\sigma_k = \sum_{j=1}^{N} LLH^j(k) \quad (42)$$

where:

k=LLH parameter, (speed, altitude, fpa, etc.);

j=Filter hypothesis; and $\sigma_k$=sum of LLH values for parameter k for N filter outputs.

The second step in block 1120 is to normalize the LLH values for each filter hypothesis j $$LLH^j(k) \Longleftarrow \frac{LLH^j(k)}{\sigma_k} \quad (43)$$

The third step is to select weighting parameters for each LLH parameter such that the sum of the weights equals unity or 1

$$\sum_{i=1}^{k} W_i = 1 \quad (44)$$

The weighted maximum likelihood value WMLH is then computed for each filter hypothesis $$WMLH(j) = \sum_{i=1}^{k} MLH^j(i) W_i \quad (45)$$

where:

j corresponds to filter hypothesis j; and i corresponds to LLH parameter i for filter hypothesis j.

The maximum WMLH(j) is chosen as the correct hypothesis thereby identifying the correct rocket type.

Under certain circumstances, it may not be possible to uniquely or indisputably resolve the target ID using the kinematic parameters alone. Auxiliary information sources and filter parameters can be used to eliminate or exclude filter hypotheses which are implausible, thus removing or eliminating most of the contentious filter hypotheses. For example, intelligence data may suggest different weighting values for the various parameters, resulting in more distinct LLH values. Plume inputs of actual staging event occurrence and final burnout time can be compared with filter estimates of staging events and final burn out time to exclude certain hypothesis, as well as to confirm the target ID selected with the Maximum Likelihood value.

KARMA can used in conjunction with the Maximum-likelihood Rocket Identifier (MRI) described in [U.S. patent application Ser. No. 10/918,147, filed Aug. 13, 2004 in the name of Boka, which uses estimated rocket dynamical parameters to resolve targets with similar kinematic properties and to provide a higher confidence rocket identification system in support of boost phase engagements.

Figure 13A:
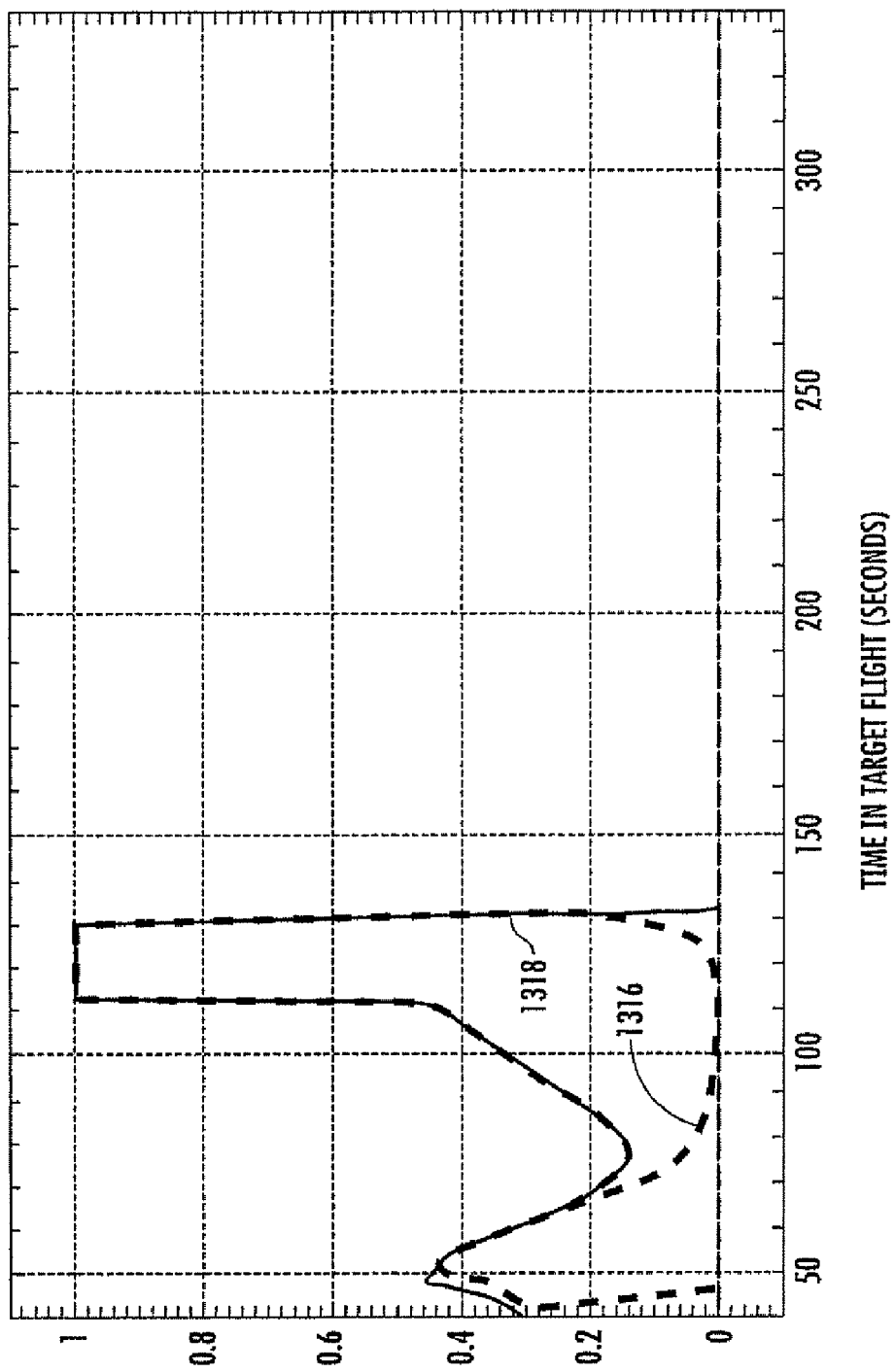
FIGS. 13*a*, 13*b*, 13*c*, and 13*d* include plots as a function of time in target flight of kinematic parameters for four different filter hypotheses.
Figure 13B:
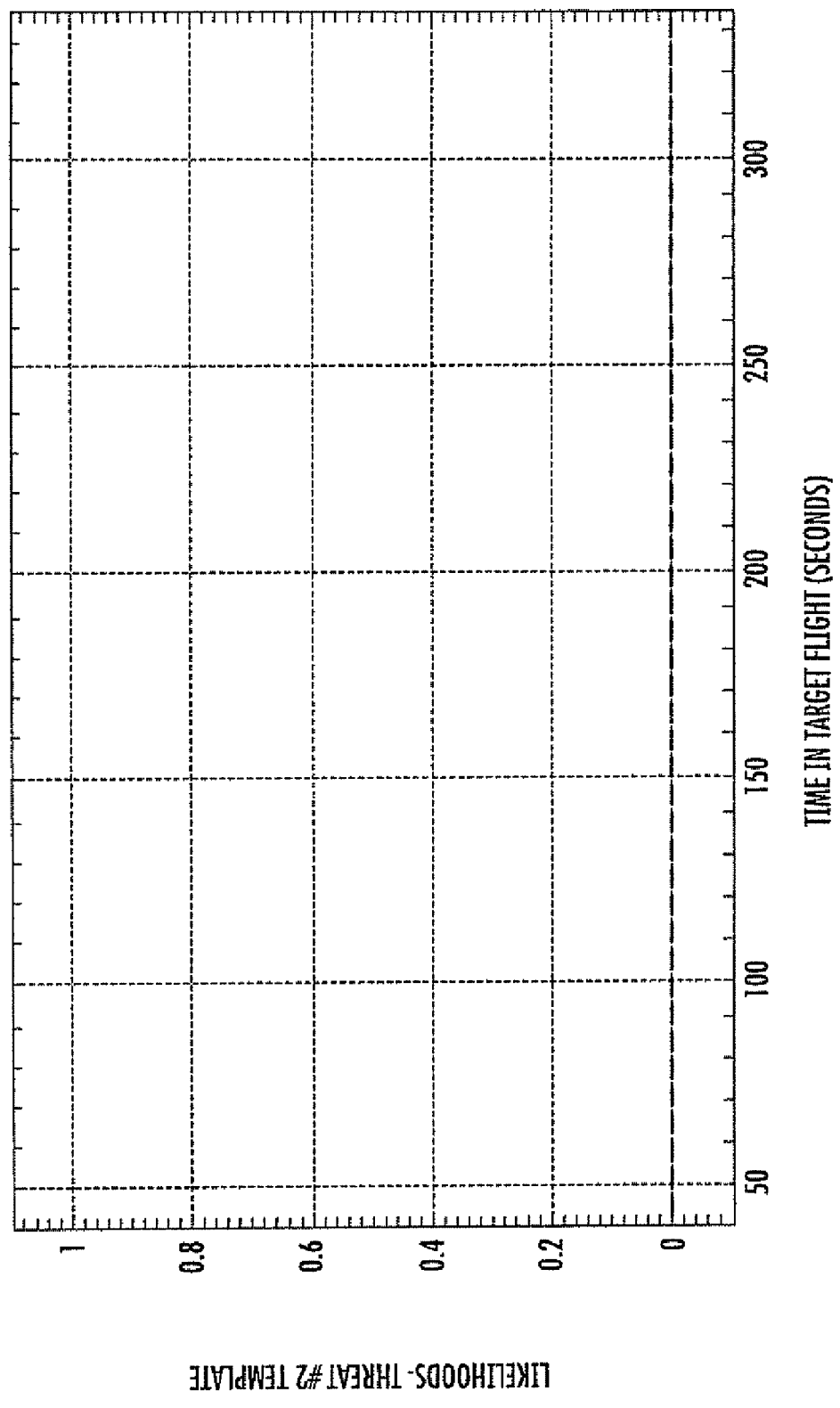
Figure 13C:
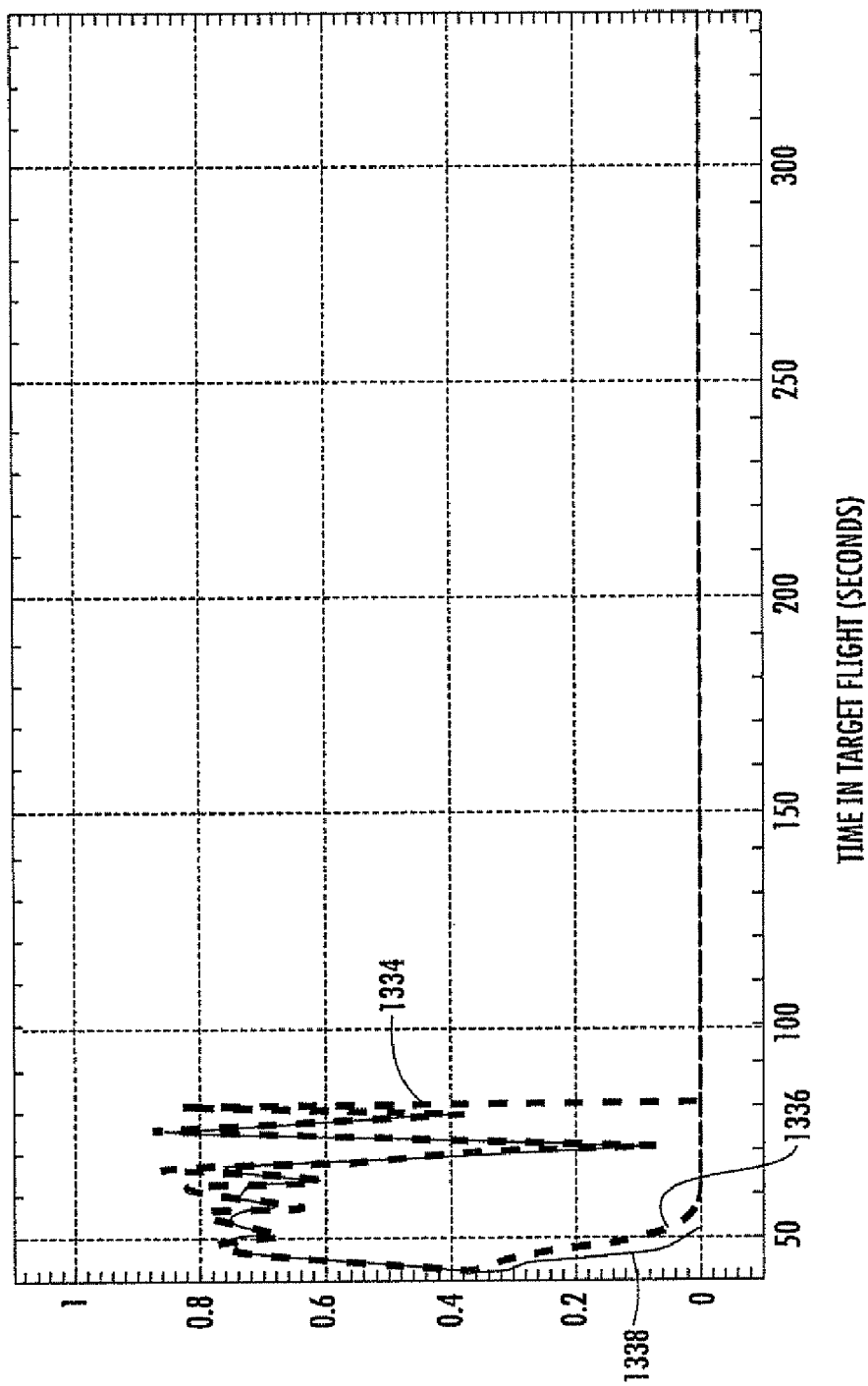
Figure 13D:
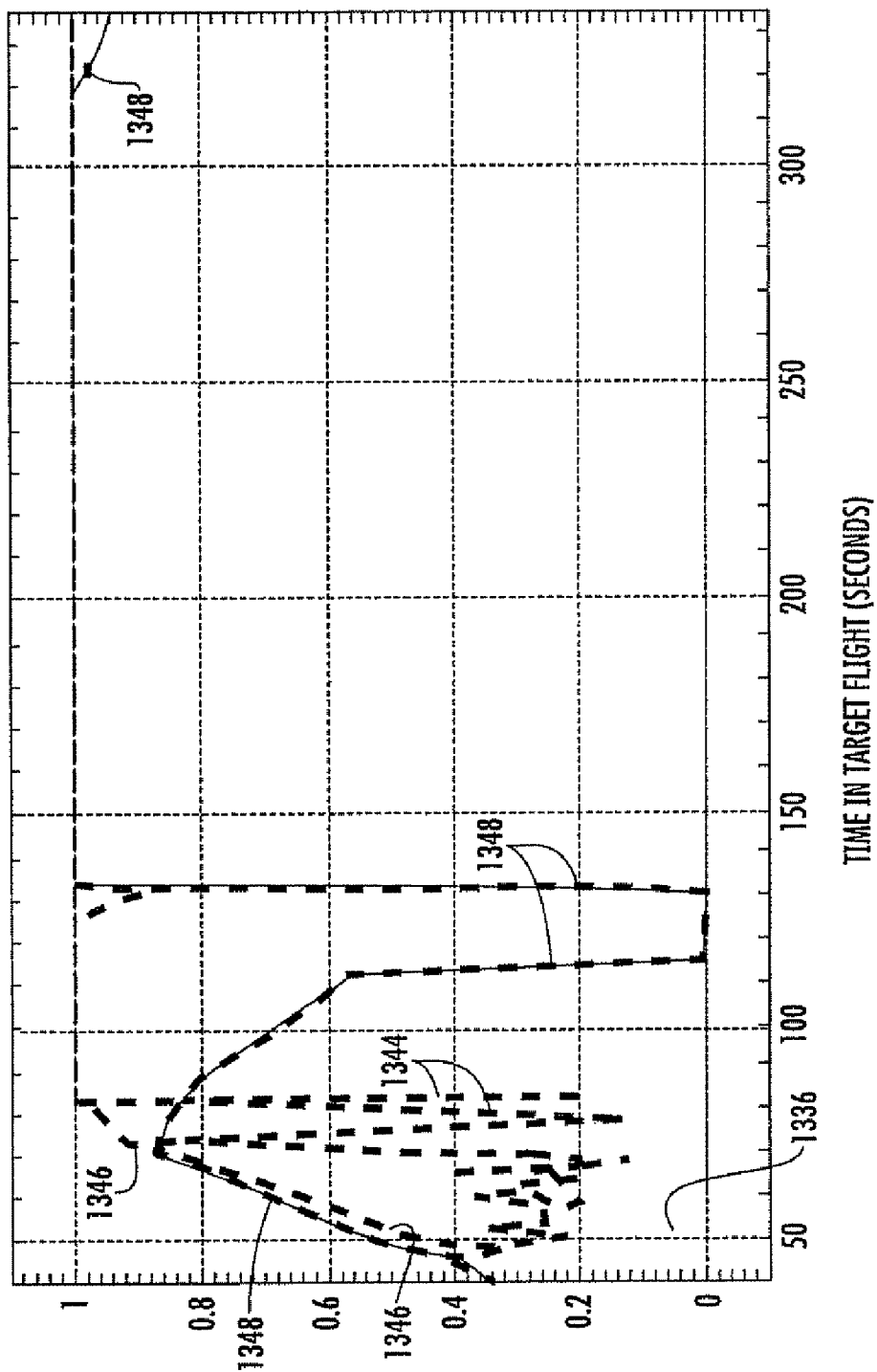
Figure 14A:
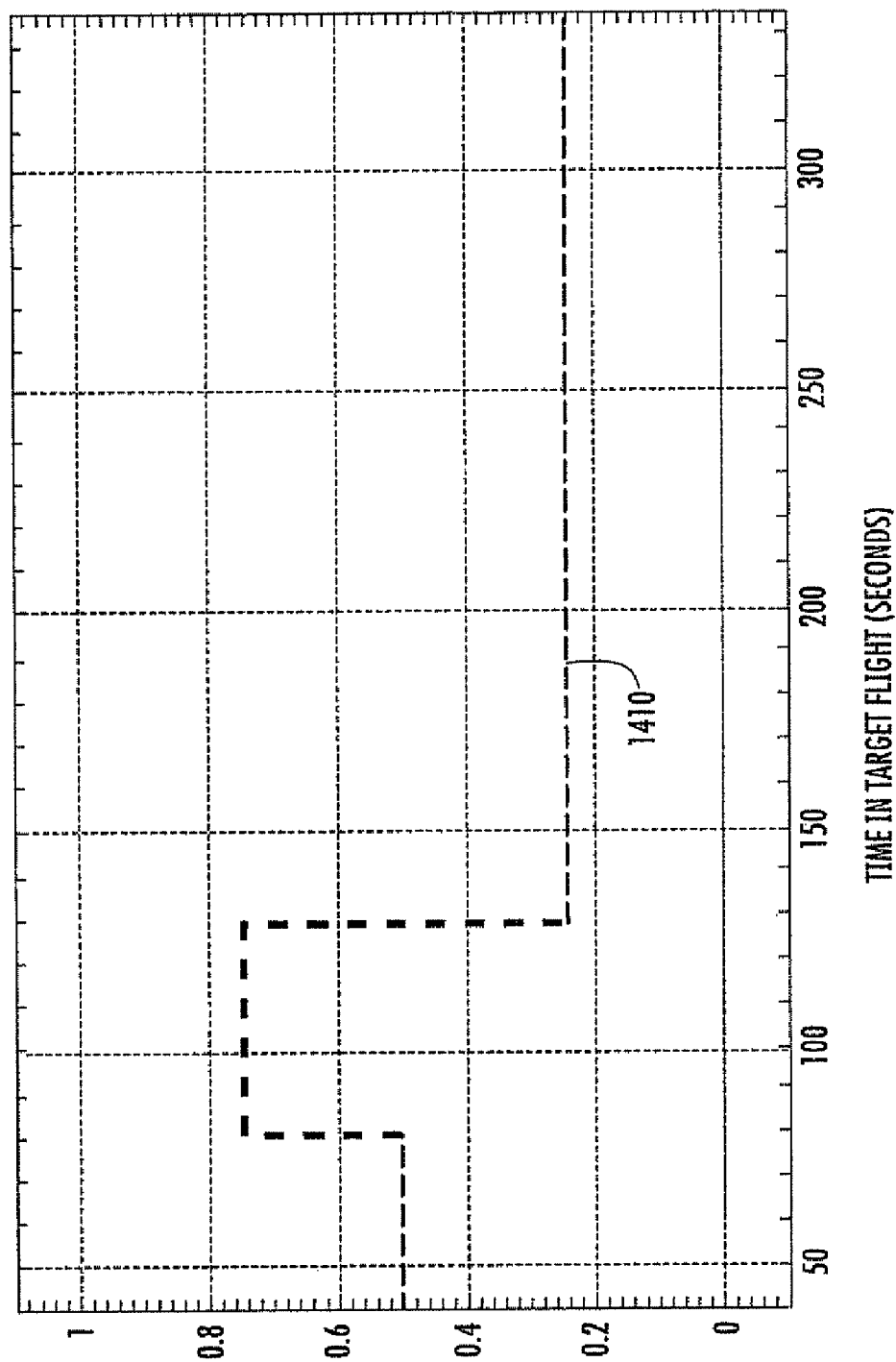
FIGS. 14*a*, 14*b*, 14*c*, and 14*d* include plots as a function of time in target flight of weighted, normalized, combined likelihood values for the four different filter hypotheses of FIGS. 13*a*, 13*b*, 13*c*, and 13*d*.
Figure 14B:
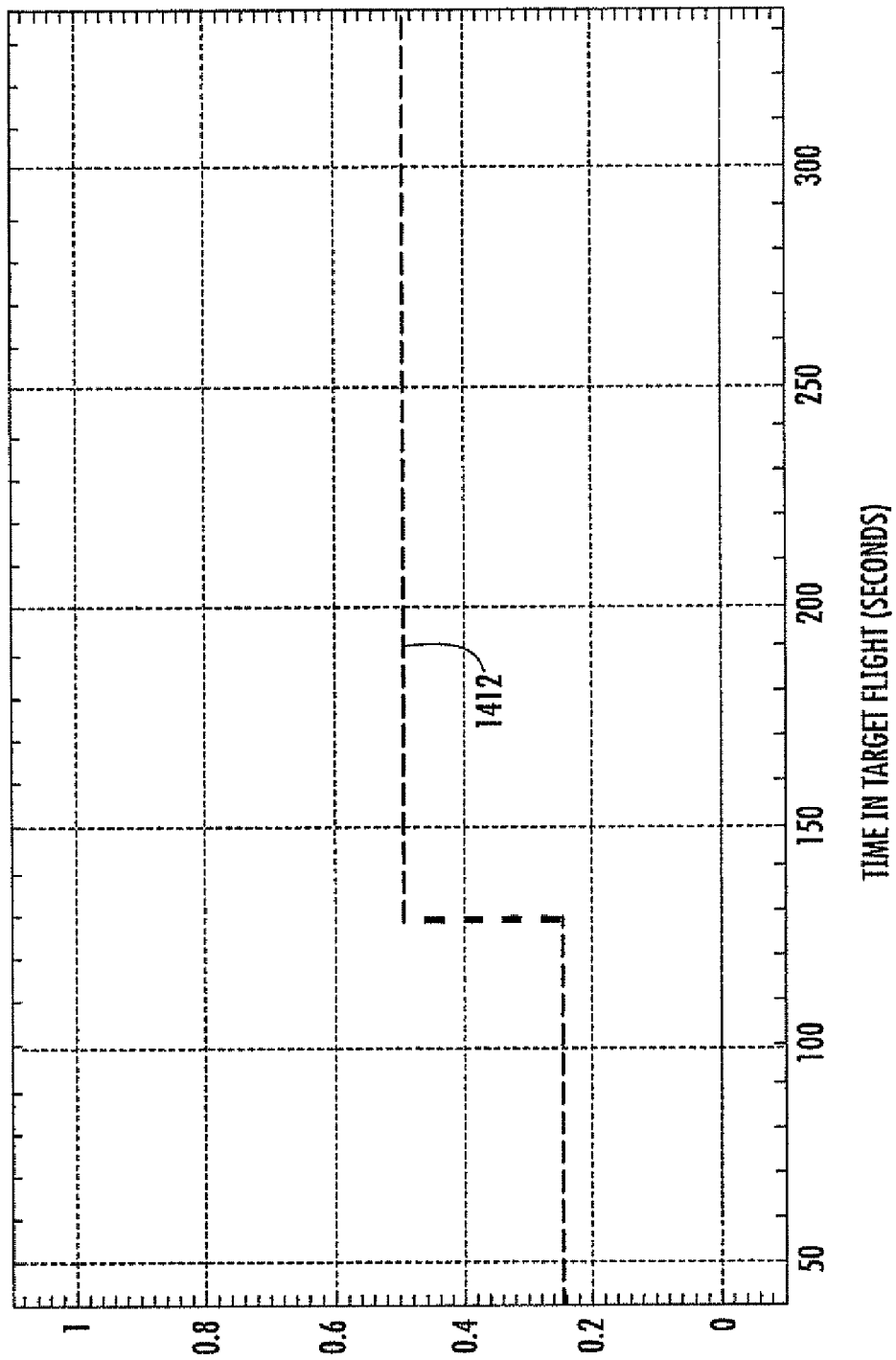
Figure 14C:
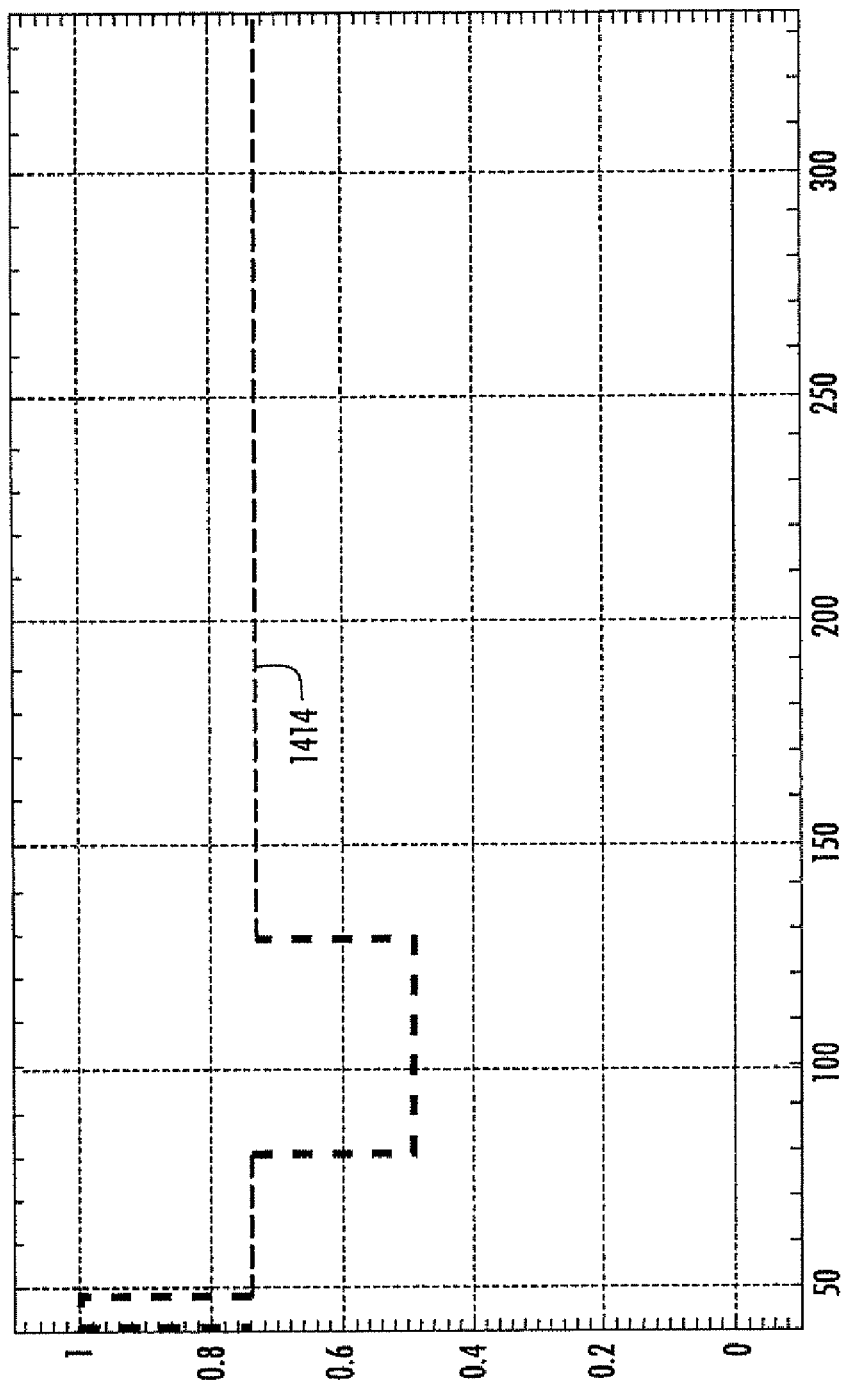
Figure 14D:
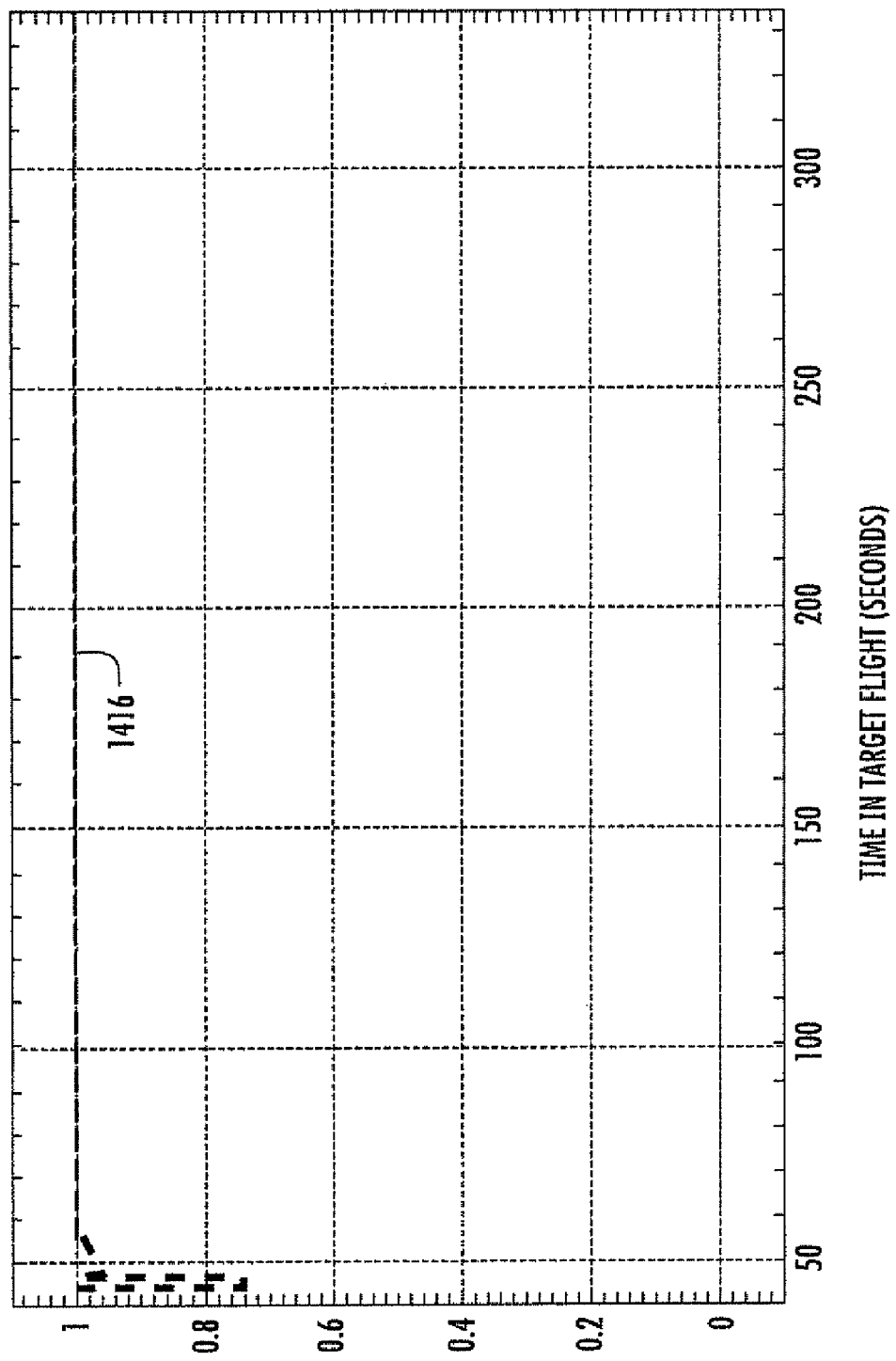
Figure 15A:
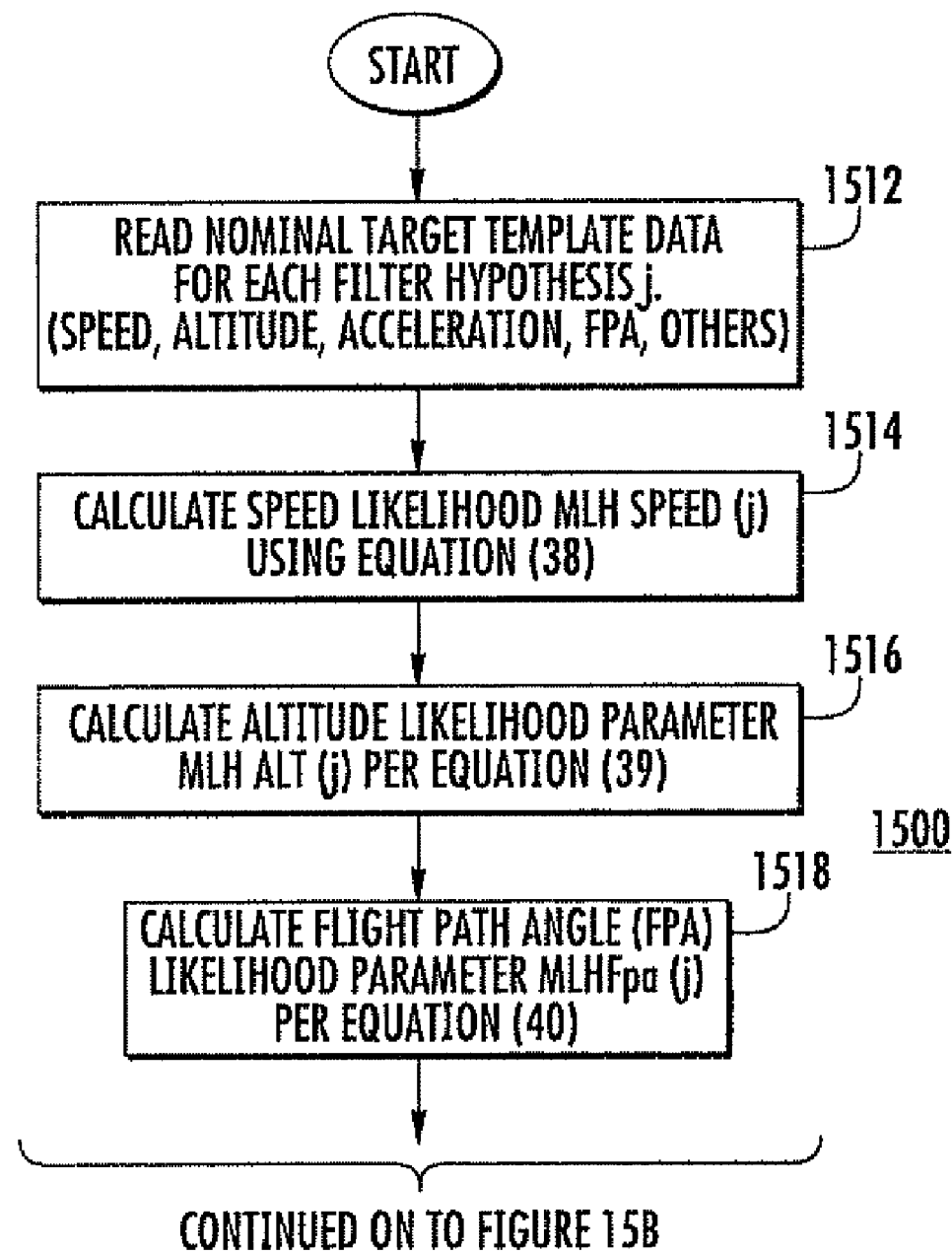
FIGS. 15*a* and 15*b* together represent a logic flow chart or diagram illustrating steps according to an aspect of the invention.
Figure 15B:
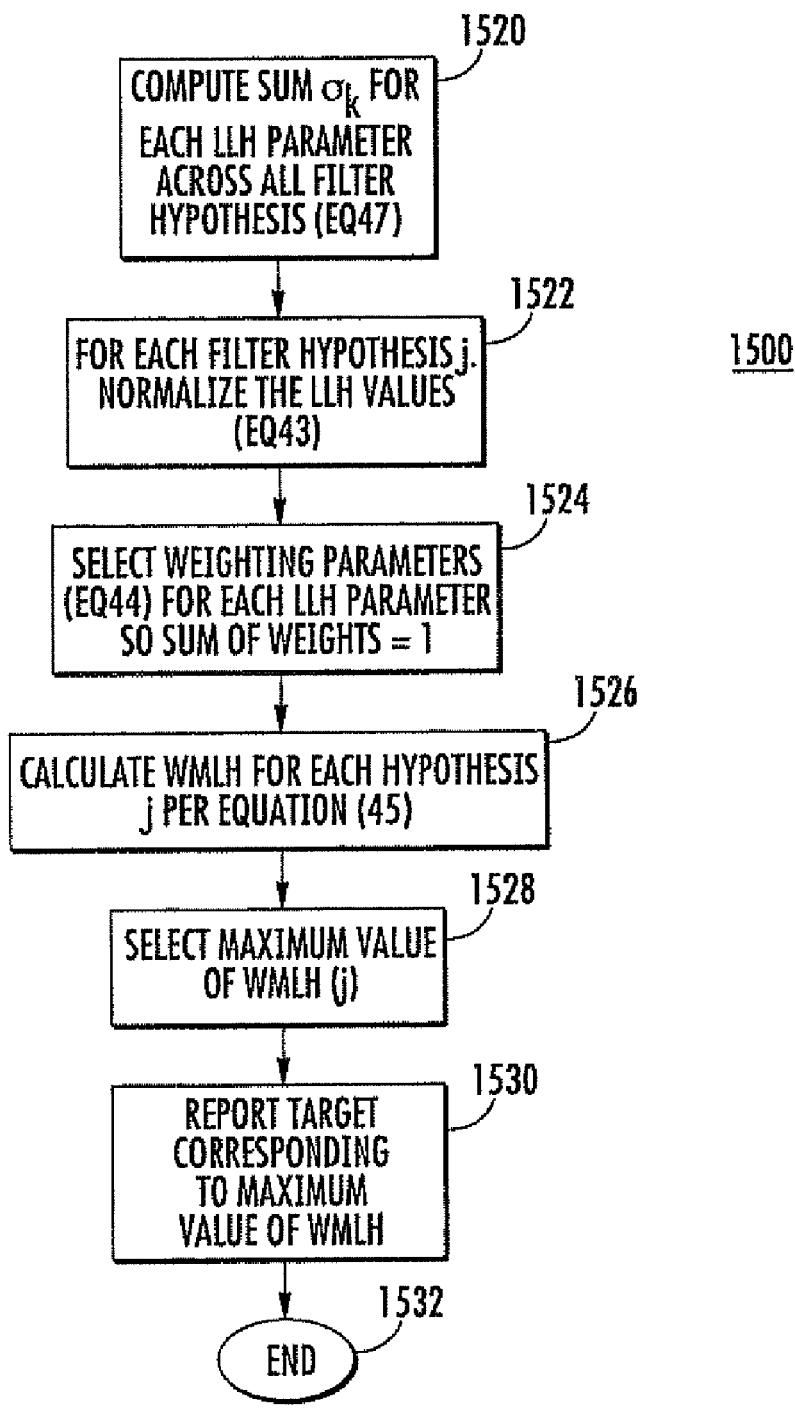

FIGS. 15a and 15b are logic flow diagrams or charts showing the logic steps of a representative set of calculations for identifying a rocket, and the likelihood of the identification being correct, according to an aspect of the invention. The logic flow 1500 of FIGS. 15a and 15b represents, for FIG. 15a, computations performed in block 1112 of FIG. 11, and FIG. 15b represents computations performed in block 1120. The logic of FIG. 15a begins at a START block 1510, and flows to a block 1512. Block 1512 represents the reading of nominal target template data for each filter hypothesis j. In the representative calculation of FIGS. 15a and 15b, only speed, altitude (ALT), and flight path angle (FPA) are considered. FIGS. 13a, 13b, 13c, and 13d are plots of likelihood of threat #1, #2, #3, and #4 based on four filter hypotheses applied to KARMA processor 1110 of FIG. 11 and considering likelihoods based on altitude (ALT), speed, and flight path angle (FPA). The altitude likelihood is calculated in block 1514 of FIG. 15a accordance with equation (39), the speed likelihood is calculated in block 1516 in accordance with equation (38) and the flight path angle is calculated in block 1518 in accordance with equation (40). The examples aid in showing KARMA's ability to correctly identify the target in track from among four filter hypotheses. FIGS. 13a, 13b, 13c, and 13d show the Kinematic Likelihood parameter values which are outputted from four filter hypotheses. In FIG. 13a, the altitude likelihood is illustrated by a dash line 1316, and the speed likelihood is illustrated by a solid line 1318. The likelihoods of FIG. 13a (template #1) have no independent significance, except as they relate to or compare with the values of the likelihoods of the other templates of FIGS. 13b, 13c, and 13d. That one of the templates having the highest value is deemed to be the one associated with the correct hypothesis. FIG. 13b shows no plots whatever, meaning that all the likelihood values for this filter (template #2) are zero, so this template is definitely not associated with the correct target hypothesis. FIG. 13c shows a decreasing early speed likelihood represented by solid line 1338, a variable FPA likelihood illustrated by a dash line 1334, and a altitude likelihood illustrated by a dash line 1336. The values drop to zero above about 80 seconds time in target flight. These values are finite, and may preliminarily indicate some likelihood of it's being the correct hypothesis. FIG. 13d illustrates a solid-line speed likelihood plot 1338, a dash altitude likelihood plot 1346, and a dash FPA likelihood plot 1344. Block 1514 of FIG. 15a represents the calculation of the speed likelihood parameter MLHSpeed(j) using equation (38). Block 1516 of FIG. 15a represents the calculation of the altitude likelihood parameter MLHAlt(j) pursuant to equation (39). Block 1518 of FIG. 15a represents the calculation of the flight path angle (FPA) likelihood parameter MLHFpa(j) for the various hypotheses j according to equation (41).

The logic flows from block 1518 of FIG. 15a to block 1520 of FIG. 15b. Block 1520 represents computation of the sum $\sigma_k$ for each LLH parameter (that is, for speed, altitude, and flight path angle in the example) across all filter hypotheses, pursuant to equation (42). From block 1520, the logic of FIG. 15b flows to a block 1522, which represents normalization of each of the LLH values for each filter hypothesis j pursuant to equation (43). Block 1524 of FIG. 15b represents the selection of weighting functions or parameters pursuant to equation (44) for each LLH parameter, in such a fashion that the sum of the weights is unity or 1.

FIGS. 14a, 14b, 14c, and 14d are weighted, normalized combined WMLH likelihood values 1410, 1412, 1414, and 1416, respectively, calculated in block 1526 of FIG. 15b in accordance with equation (45) from the likelihood parameters (for the same four filter hypotheses or threat templates) of FIGS. 13a, 13b, 13c, and 13d. The filter hypothesis which has the largest combined likelihood value is identified as (or deemed to be) the target in track, as suggested by block 1528 of FIG. 15b. Plots 1410, 1412, and 1414 have values which do not exceed 0.8 after an initial period of, say, 50 seconds. Plot 1416 of FIG. 14d, however, has a value of unity (1.0) at all times after about 50 seconds, thereby indicating that the fourth filter hypothesis is correct. Finally, the identified target exhibiting the largest combined likelihood value is identified as suggested by block 1528 of FIG. 15b. The logic ends at an END block 1532.

A method according to an aspect of the invention is for identifying a missile, which may be in a boosting phase. The method comprises the steps of receiving radar returns from a missile to thereby generate a plurality of position measurements constituting a target missile track. A plurality of nominal missile parameters, which may be rocket parameters (such as speed, altitude, and flight path angle), are provided for each missile type which is of interest (for each hypothesis). Each of the nominal missile rocket parameters for each missile type which is of interest are applied to a separate boost phase filter of a set (11400) of plural boost phase filters (11400a, 11400b, 11400c, ..., 11400N). The track is applied to each filter of the set of plural phase filters (which may be boost phase filters), to thereby generate a plurality of state estimates, one from each filter (11400a, 11400b, 11400c, ..., 11400N) of the set (11400). The output of each of the filters is processed with the nominal missile rocket parameters applied to the filter, to generate (blocks 1514, 1516, 1518) a maximum likelihood value for each filter parameter (such as speed, altitude, and flight path angle) and filter output. That missile represented by the filter exhibiting the maximum likelihood is selected (blocks 1520, 1522, 1524, 1526, 1528) as the correct missile type. In one mode of the method, the step of providing a plurality of nominal missile parameters for each missile type which is of interest comprises the step of providing at least nominal missile speed, altitude, and flight path angle. When the filters are boost phase filters, the parameters may include acceleration.

In another mode of the method, the step of processing the output of each of the boost phase filters with the nominal missile rocket parameters applied to the boost phase filter comprises the steps of:

calculating the speed likelihood LLH for each filter hypothesis j by $$MLHSpeed(j) = \frac{1}{\sqrt{2\pi(P_{Speed} + P_{STemplate})}} e^{\left(\frac{-\frac{1}{2}delSpeed^2}{(P_{Speed} + P_{STemplate})}\right)} \quad (38)$$

where:

$$P_{Speed} = \frac{\dot{Z}'P_{ZZ}\dot{Z}}{\dot{Z}'\dot{Z}}$$

is the covariance of the magnitude of $\underline{\dot{Z}}$;

$$P_{STemplate} = \left(\frac{STemplate(TALest) - dt) - STemplate(TALest)}{dt}\right)^2 P_{TALest}$$

is the covariance of the speed from the nominal template lookup;

delSpeed=Speed(j)−STemplate(TALest) is the speed difference between the filter value and the template value; and dt=0.1 is a small time increment. In another mode of the method, the step of processing the output of each of the boost phase filters with the nominal missile rocket parameters applied to the boost phase filter comprises the steps of:

calculating the altitude likelihood parameter MLHAlt for each filter hypothesis j by $$MLHAlt(j) = \frac{1}{\sqrt{2\pi(P_{Alt} + P_{AltTemplate})}} e^{\left(\frac{-\frac{1}{2}delAlt^2}{(P_{Alt}+P_{AltTemplate})}\right)} \quad (39)$$

where:

$$P_{Alt} = \frac{Z' P_{ZZ} Z}{Z'Z}$$

is the covariance of the target altitude;

$$P_{AltTemplate} = \left(\frac{AltTemplate(TALest-dt) - AltTemplate(TALest)}{dt}\right)^2 P_{TALest}$$

is the covariance of the speed from the nominal template lookup;

$$P_{AltTemplate} = \left(\frac{AltTemplate(TALest-dt) - AltTemplate(TALest)}{dt}\right)^2 P_{TALest}$$

is the covariance of the speed from the nominal template lookup; and dt=0.1 is some small time increment.

In yet another mode of the method according to an aspect of the invention the step of processing the output of each of the boost phase filters with the nominal missile rocket parameters applied to the boost phase filter comprises the steps of:

calculating the flight path angle likelihood $MLHF_{pa}$ for each filter hypothesis j using $$MLHFpa(j) = \frac{1}{\sqrt{2\pi(P_{Fpa} + P_{FpaTemplate})}} e^{\left(\frac{-\frac{1}{2}delFpa^2}{(P_{Fpa}+P_{FpaTemplate})}\right)} \quad (40)$$

where:

$P_{Fpa}$ is the covariance of the magnitude of the flight path angle calculated using $$P_{Fpa} = TT*(T'_P P_{ZZ} T_P + T_V' P_{\dot Z \dot Z} T_V + T'_P P_{Z\dot Z} T_V + T_V' P_{\dot Z Z} T_P) \quad (41)$$

where:

$$TT = \frac{1}{(1-\cos^2\theta)*|Z|*|\dot Z|};$$

$$\cos\theta = \frac{Z'\dot Z}{|Z||\dot Z|}$$

-continued $$T_P = \frac{(Z \cdot \dot Z)Z}{Z \cdot Z} - \dot Z; \text{ and}$$

$$T_V = \frac{(Z \cdot \dot Z)\dot Z}{\dot Z \cdot \dot Z} - Z$$

$$P_{FpaTemplate} = \left(\frac{FpaTemplate(TALest-dt) - FpaTemplate(TALest)}{dt}\right)^2 P_{TALest}$$

is the covariance of the nominal flight path angle template lookup;

delFpa=Fpa(j)−FpaTemplate(TALest) is the flight path angle difference between the filter value and the template value; and dt=0.1 is some small time increment.

In another mode of this aspect of the method of the invention, the step of selecting as the correct missile type that missile represented by the filter exhibiting the maximum likelihood comprises the steps of:

normalizing the kinematic likelihood parameters across the entire filter set to thereby produce normalized kinematic likelihood parameters;

weighting the normalized kinematic likelihood parameters to produce weighted normalized kinematic likelihood parameters; and combining the weighted normalized kinematic likelihood parameters so that each filter hypothesis has a normalized total maximum likelihood value. In this particular mode, the step of normalizing the kinematic likelihood parameters across the entire filter set comprises the steps of:

computing the sum $\sigma_k$, of the LLH values for each parameter across all filter hypothesis $$\sigma_k = \sum_{j=1}^{N} LLH^j(k) \quad (42)$$

where:

k=LLH parameter, (speed, altitude, fpa, etc.);

j=Filter hypothesis; and $\sigma_k$=sum of LLH values for parameter k for N filter outputs; and normalizing the likelihood values for each filter hypothesis j by $$LLH^j(k) \Longleftarrow \frac{LLH^j(k)}{\sigma_k} \quad (43)$$

The step of weighting the normalized kinematic likelihood parameters may comprise the steps of:

selecting weighting parameters for each LLH parameter such that the sum of the weights equals unity or 1 by $$\sum_{i=1}^{k} W_i = 1 \quad (44)$$

computing the weighted maximum likelihood value WMLH for each filter hypothesis $$WMLH(j) = \sum_{i=1}^{k} MLH^j(i) W_i \qquad (45)$$

where:

j corresponds to filter hypothesis j; and i corresponds to LLH parameter i for filter hypothesis j. This mode may further comprise the step of deeming that filter hypothesis associated with the maximum value of weighted maximum likelihood to be the correct hypothesis. This in turn may be accompanied by the step of identifying the missile type of the target missile to be that missile type associated with the correct filter hypothesis.

A method (1500) for identifying a missile according to another aspect of the invention comprises the steps of receiving radar returns from a missile to thereby generate a plurality of position measurements constituting a target missile track, and providing a plurality (11400) of nominal missile parameters (300) for each missile type which is of interest. Each of the nominal missile rocket parameters for each missile type which is of interest is applied to a separate boost phase filter (412 of set 11400) of a set of plural boost phase filters. The track is applied to each boost phase filter of the set of plural boost phase filters, to thereby generate (on path 11440) a plurality of state estimates, one for each missile type of interest. The output of each of the boost phase filters is processed (1514, 1516, 1518, . . . ) with the nominal missile rocket parameters applied to the boost phase filter, to generate at least one maximum likelihood value for each filter parameter and missile type of interest. For each of the maximum likelihood values, the sum is computed (1520) across all the missile types of interest. The likelihood values for all missile types of interest are normalized (1522) to thereby generate normalized likelihood values. Weighting parameters are selected (1524) for each likelihood parameter, such that the sum of the weights for each parameter equals unity. The weighted maximum likelihood value for each missile type of interest is determined (1526). That missile represented by the filter exhibiting the maximum likelihood value is selected (1528, 1530) as being the correct missile.

What is claimed is:

1. A method for identifying the type of a boosting missile, said method comprising:
    receiving radar returns from a boosting missile to generate a plurality of position measurements constituting a target missile track;
    providing a plurality of nominal kinematic missile rocket parameters including at least nominal missile speed, altitude, and flight path angle, said nominal kinematic missile parameters defining templates for each of a plurality of missile types;
    applying each of said nominal kinematic missile rocket parameters for each missile of said plurality of missile types to a separate boost phase filter of a set of plural boost phase filters;
    applying said target missile track to each boost phase filter of said set of plural boost phase filters, to generate a plurality of state estimates, one from each filter; and
    providing the output of each of said boost phase filters to at least one computer processor, said at least one computer processor performing the steps of:
    processing an output of each of said boost phase filters with the nominal kinematic missile rocket parameters applied to the boost phase filter, to generate a maximum likelihood value for each filter parameter and filter output; and
    selecting as a correct missile type that missile type associated with the filter having the maximum likelihood value.

2. A method according to claim 1, wherein said step of processing the output of each of said boost phase filters with the nominal kinematic missile rocket parameters applied to the boost phase filter comprises the steps of:
    calculating a speed likelihood parameter LLH for each filter hypothesis j of a plurality of filter hypotheses by $$MLHSpeed(j) = \frac{1}{\sqrt{2\pi(P_{Speed} + P_{STemplate})}} e^{\left(\frac{-\frac{1}{2}delSpeed^2}{(P_{Speed} + P_{STemplate})}\right)}$$

where:

$$P_{Speed} = \frac{\dot{Z}' P_{zz} \dot{Z}}{\dot{Z}' \dot{Z}}$$

is a covariance of a magnitude of $\underline{\dot{Z}}$;

$$P_{STemplate} = \left(\frac{STemplate(TALest - dt) - STemplate(TALest)}{dt}\right)^2 P_{TALest}$$

is a covariance of a speed from a nominal template lookup;
    delSpeed=Speed(j)−STemplate(TALest) is a speed difference between the filter value and the template value; and
    dt=0.1 is a small time increment.

3. A method according to claim 1, wherein said step of processing the output of each of said boost phase filters with the nominal kinematic missile rocket parameters applied to the boost phase filter comprises the steps of:
    calculating an altitude likelihood parameter MLHAlt for each filter hypothesis j of a plurality of filter hypotheses by $$MLHAlt(j) = \frac{1}{\sqrt{2\pi(P_{Alt} + P_{AltTemplate})}} e^{\left(\frac{-\frac{1}{2}delAlt^2}{(P_{Alt} + P_{AltTemplate})}\right)}$$

where:

$$P_{Alt} = \frac{Z' P_{zz} Z}{Z' Z}$$

is a covariance of a target altitude;

$$P_{AltTemplate} = \left(\frac{AltTemplate(TALest - dt) - AltTemplate(TALest)}{dt}\right)^2 P_{TALest}$$

is a covariance of a speed from a nominal template lookup;

$$P_{AltTemplate} = \left(\frac{AltTemplate(TALest - dt) - AltTemplate(TALest)}{dt}\right)^2 P_{TALest}$$

is a covariance of a speed from a nominal template lookup; and
    dt=0.1 is a small time increment.

4. A method according to claim 1, wherein said step of processing the output of each of said boost phase filters with the nominal kinematic missile rocket parameters applied to the boost phase filter comprises the steps of:
  calculating a flight path angle likelihood parameter MLH-Fpa for each filter hypothesis j of a plurality of filter hypotheses by $$MLHFpa(j) = \frac{1}{\sqrt{2\pi(P_{Fpa} + P_{FpaTemplate})}} e^{\left(\frac{-\frac{1}{2}delFpa^2}{(P_{Fpa}+P_{FpaTemplate})}\right)}$$

where:
  $P_{Fpa}$ is a covariance of a magnitude of a flight path angle calculated using $$P_{Fpa}TT^*(T'_p P_{ZZ}T_p + T_v'P_{ZZ}T_v + T'_p P_{ZZ}T_v + T_v'P_{ZZ}T_p)$$

where:

$$TT = \frac{1}{(1-\cos^2\theta)^*|Z|^*|\dot{Z}|};$$

$$\cos\theta = \frac{Z'\dot{Z}}{|Z||\dot{Z}|}$$

$$T_P = \frac{(Z\cdot\dot{Z})Z}{Z\cdot Z} - \dot{Z}; \text{ and}$$

$$T_V = \frac{(Z\cdot\dot{Z})\dot{Z}}{\dot{Z}\cdot\dot{Z}} - Z$$

$$P_{FpaTemplate} = \left(\frac{FpaTemplate(TALest - dt) - FpaTemplate(TALest)}{dt}\right)^2 P_{TALest}$$

is a covariance of a nominal flight path angle template lookup;
  delFpa=Fpa(j)−FpaTemplate(TALest) is a flight path angle difference between the filter value and the template value; and
  dt=0.1 is a small time increment.

5. A method according to claim 1, wherein said step of selecting as the correct missile type that missile type associated with the filter having the maximum likelihood value comprises the steps of:
  normalizing the likelihood parameters across the entire filter set to produce normalized kinematic likelihood parameters;
  weighting said normalized kinematic likelihood parameters to produce weighted normalized kinematic likelihood parameters; and
  combining said weighted normalized kinematic likelihood parameters so that each filter hypothesis of the plurality of filter hypotheses has a normalized total maximum likelihood value.

6. A method according to claim 5, wherein said step of normalizing the kinematic likelihood parameters across the entire filter set comprises the steps of:
  computing a sum $\sigma_k$ of the LLH values for each parameter across all filter hypothesis $$\sigma_k = \sum_{j=1}^{N} LLH^j(k)$$

where:
  k=LLH parameter, (speed, altitude, fpa, etc.);
  j=Filter hypothesis; and $\sigma_k$=sum of LLH values for parameter k for N filter outputs; and
  normalizing the LLH values for each filter hypothesis j by $$LLH^j(k) \Leftarrow \frac{LLH^j(k)}{\sigma_k}.$$

7. A method according to claim 5, wherein said step of weighting said normalized kinematic likelihood parameters comprises the steps of:
  selecting weighting parameters for each LLH parameter such that a sum of the weights equals unity or 1 by $$\sum_{i=1}^{k} W_i = 1$$

computing a weighted maximum likelihood value WMLH for each filter hypothesis $$WMLH(j) = \sum_{i=1}^{k} MLH^j(i)W_i$$

where:
  j corresponds to filter hypothesis j; and
  i corresponds to LLH parameter i for filter hypothesis j.

8. A method according to claim 7, further comprising the step of identifying that filter hypothesis associated with the maximum value of weighted maximum likelihood to be a correct hypothesis.

9. A method according to claim 8, further comprising the step of identifying a missile type to be the missile type associated with said correct filter hypothesis.

10. A method for identifying a missile, said method comprising the steps of:
  receiving radar returns from a missile to generate a plurality of position measurements constituting a target missile track;
  providing a plurality of nominal kinematic missile parameters including at least nominal missile speed, altitude, and flight path angle, said nominal kinematic missile parameters defining templates for each missile type of a plurality of missile types;
  applying each of said nominal kinematic missile parameters for each missile type to a separate boost phase filter of a set of plural boost phase filters;
  applying said target missile track to each boost phase filter of said set of plural boost phase filters, to generate a plurality of state estimates, one for each missile type; and
  providing the output of each of said boost phase filters to at least one computer processor, said at least one computer processor performing the steps of:
    processing an output of each of said boost phase filters with the nominal kinematic missile parameters applied to the boost phase filter, to generate at least one maximum likelihood value for each filter parameter and missile type;
    for each of said maximum likelihood values, computing a sum across all said missile types;
    normalizing the likelihood values for all missile types to generate normalized likelihood values;

selecting weighting parameters for each likelihood value, such that the sum of the weights for each likelihood value equals unity;

determining a weighted maximum likelihood value for each missile type; and selecting as a correct missile type that missile type associated with the filter having the maximum likelihood value.

11. A system for identifying a missile, said system comprising:

a non-transitory machine-readable medium upon which is stored instructions and a computer processor executing said instructions for performing the following steps:

receiving radar returns from a boosting missile to generate a plurality of position measurements constituting a target missile track;

providing a plurality of nominal kinematic missile rocket parameters including at least nominal missile speed, altitude, and flight path angle, said nominal kinematic missile parameters defining templates for each of a plurality of missile types;

applying each of said nominal kinematic missile rocket parameters for each missile of said plurality of missile types to a separate boost phase filter of a set of plural boost phase filters;

applying said target missile track to each boost phase filter of said set of plural boost phase filters, to generate a plurality of state estimates, one from each filter;

processing an output of each of said boost phase filters with the nominal kinematic missile rocket parameters applied to the boost phase filter, to generate a maximum likelihood value for each filter parameter and filter output; and selecting as a correct missile type that missile type associated with the filter having the maximum likelihood value.

12. A system according to claim 11, wherein said step of processing the output of each of said boost phase filters with the nominal kinematic missile rocket parameters applied to the boost phase filter comprises the steps of:

calculating a speed likelihood parameter for each filter hypothesis of a plurality of filter hypotheses.

13. A system according to claim 11, wherein said step of processing the output of each of said boost phase filters with the nominal kinematic missile rocket parameters applied to the boost phase filter comprises the steps of:

calculating an altitude likelihood parameter for each filter hypothesis of a plurality of filter hypotheses.

14. A system according to claim 11, wherein said step of processing the output of each of said boost phase filters with the nominal kinematic missile rocket parameters applied to the boost phase filter comprises the steps of:

calculating a flight path angle likelihood parameter for each filter hypothesis of a plurality of filter hypotheses.

15. A system according to claim 11, wherein said step of selecting as the correct missile type that missile type associated with the filter having the maximum likelihood value comprises the steps of:

normalizing the likelihood parameters across the entire filter set to produce normalized kinematic likelihood parameters;

weighting said normalized kinematic likelihood parameters to produce weighted normalized kinematic likelihood parameters; and combining said weighted normalized kinematic likelihood parameters so that each filter hypothesis of the plurality of filter hypotheses has a normalized total maximum likelihood value.

16. A system according to claim 15, wherein said step of normalizing the kinematic likelihood parameters across the entire filter set comprises the steps of:

computing a sum of the speed likelihood values for each parameter across all filter hypotheses.

17. A system according to claim 15, wherein said step of weighting said normalized kinematic likelihood parameters comprises the steps of:

selecting weighting parameters for each likelihood value such that the sum of the weights equals unity or 1.

18. A system according to claim 17, wherein the processor executes instructions for performing the further step of identifying that filter hypothesis associated with the maximum value of weighted maximum likelihood to be a correct hypothesis.

19. A system according to claim 18, wherein the processor executes instructions for performing the further step of identifying a missile type to be the missile type associated with said correct filter hypothesis.

20. A method according to claim 1, wherein said plurality of kinematic nominal missile rocket parameters includes acceleration.

21. A method according to claim 1, wherein said step of processing the output of each of said boost phase filters with the nominal missile rocket parameters applied to the boost phase filter comprises the steps of:

calculating a speed likelihood parameter for each speed template of a plurality of speed templates, calculating an altitude likelihood parameter for each altitude template of a plurality of altitude templates, and calculating a flight path angle likelihood parameter for each flight path angle template of a plurality of flight path angle templates.

22. A method for identifying the type of a boosting missile, said method comprising:

receiving radar returns from a boosting missile to generate a plurality of position measurements constituting a target missile track;

providing a plurality of nominal missile rocket parameters for each of a plurality of missile types;

applying each of said nominal missile rocket parameters for each missile of said plurality of missile types to a separate boost phase filter of a set of plural boost phase filters;

applying said target missile track to each boost phase filter of said set of plural boost phase filters, to generate a plurality of state estimates, one from each filter; and providing the output of each of said boost phase filters to at least one computer processor, said at least one computer processor performing the steps of:

processing an output of each of said boost phase filters with the nominal missile rocket parameters applied to the boost phase filter, to generate a maximum likelihood value for each filter parameter and filter output; and selecting as a correct missile type that missile type associated with the filter having the maximum likelihood value, wherein said step of processing the output of each of said boost phase filters with the nominal missile rocket parameters applied to the boost phase filter comprises the step of:

calculating an altitude likelihood parameter for each filter hypothesis of a plurality of filter hypotheses.

23. A system for identifying a missile, said system comprising:
- a non-transitory machine-readable medium upon which is stored instructions, and
- a computer processor executing said instructions for performing the following steps:
- receiving radar returns from a boosting missile to generate a plurality of position measurements constituting a target missile track;
- providing a plurality of nominal missile rocket parameters for each of a plurality of missile type;
- applying each of said nominal missile rocket parameters for each missile of said plurality of missile types to a separate boost phase filter of a set of plural boost phase filters;
- applying said target missile track to each boost phase filter of said set of plural boost phase filters, to generate a plurality of state estimates, one from each filter;
- processing an output of each of said boost phase filters with the nominal missile rocket parameters applied to the boost phase filter, to generate a maximum likelihood value for each filter parameter and filter output; and
- selecting as a correct missile type that missile type associated with the filter having the maximum likelihood value,
- wherein said step of processing the output of each of said boost phase filters with the nominal missile rocket parameters applied to the boost phase filter comprises the step of:
- calculating an altitude likelihood parameter for each filter hypothesis of a plurality of filter hypotheses.

* * * * *